United States Patent
Miyamae

(10) Patent No.: US 8,255,367 B2
(45) Date of Patent: Aug. 28, 2012

(54) FILE MANAGEMENT APPARATUS, METHOD, AND PROGRAM

(75) Inventor: Takeshi Miyamae, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 327 days.

(21) Appl. No.: 12/790,978

(22) Filed: May 31, 2010

(65) Prior Publication Data

US 2010/0312753 A1 Dec. 9, 2010

(30) Foreign Application Priority Data

Jun. 8, 2009 (JP) .................................. 2009-137665

(51) Int. Cl.
*G06F 17/00* (2006.01)
(52) U.S. Cl. ...................................................... 707/648
(58) Field of Classification Search .................... 707/648
See application file for complete search history.

(56) References Cited

U.S. PATENT DOCUMENTS

| | | | | |
|---|---|---|---|---|
| 5,287,501 A | * | 2/1994 | Lomet | 707/648 |
| 5,596,710 A | * | 1/1997 | Voigt | 714/19 |
| 6,298,425 B1 | * | 10/2001 | Whitaker et al. | 711/162 |
| 7,036,044 B1 | * | 4/2006 | Verma et al. | 714/19 |
| 2004/0139128 A1 | * | 7/2004 | Becker et al. | 707/204 |
| 2005/0267916 A1 | | 12/2005 | Tone et al. | |

FOREIGN PATENT DOCUMENTS

| JP | 60-142446 A | 7/1985 |
|---|---|---|
| JP | 04-184641 A | 7/1992 |
| JP | 2006-012121 A | 1/2006 |

* cited by examiner

*Primary Examiner* — James Trujillo
*Assistant Examiner* — Kurt Mueller
(74) *Attorney, Agent, or Firm* — Fujitsu Patent Center

(57) ABSTRACT

A disclosed method includes acquiring and a forward log and extracting forward file operations applied to files in an order of applying these from the forward log, specifying generation rules for generating backward file operations with reference to the forward file operations, generating the backward file operations by the specified generation rules and recording these, and applying the forward file operations to the files not having the extracted forward file operations applied and also applying the backward file operations to the files having the forward file operations applied to recover the files not having the forward file operations applied.

5 Claims, 23 Drawing Sheets

FIG.5
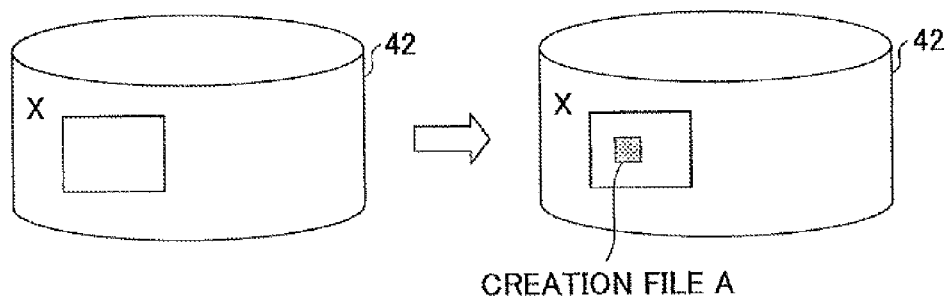
FORWARD OPERATION
CREATION FILE A
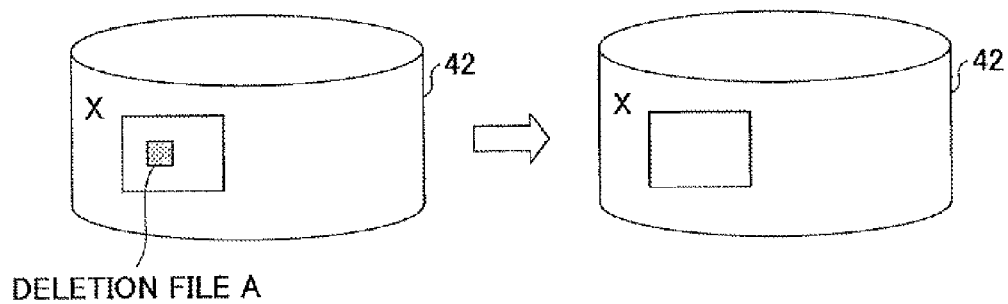
BACKWARD OPERATION
DELETION FILE A

FIG.6
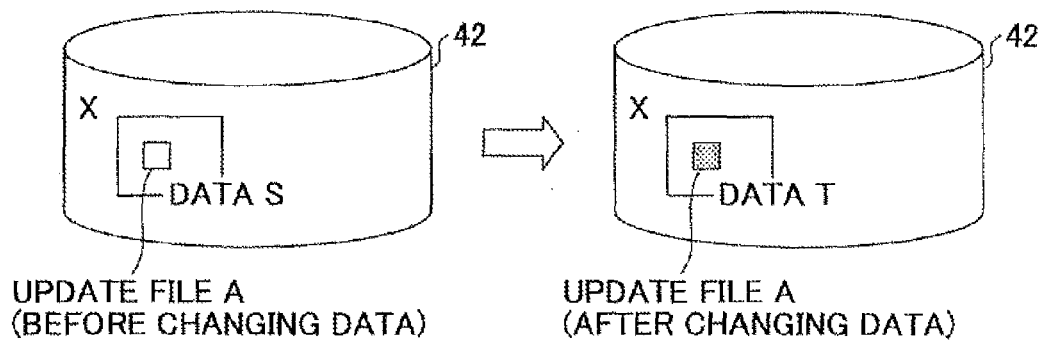
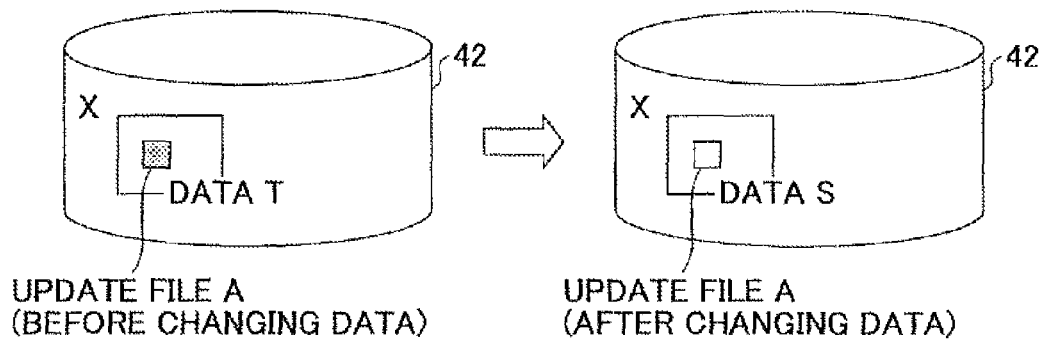

FIG.7
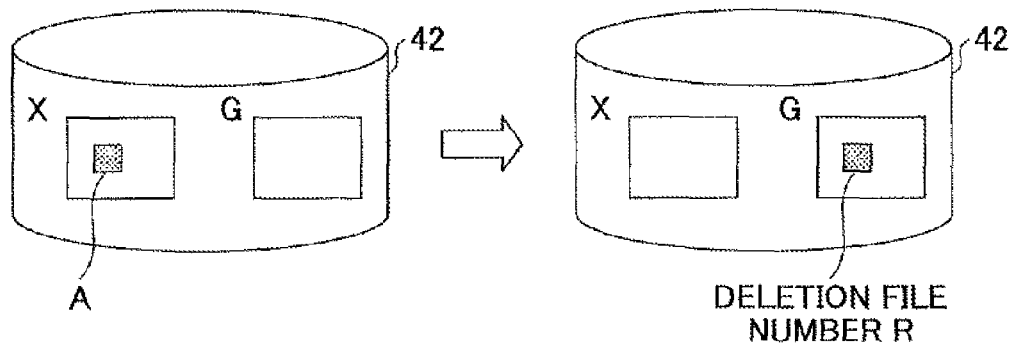
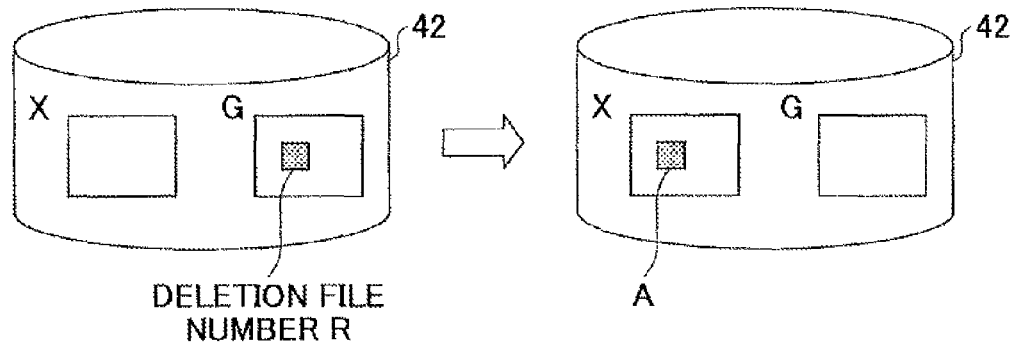

FIG.8
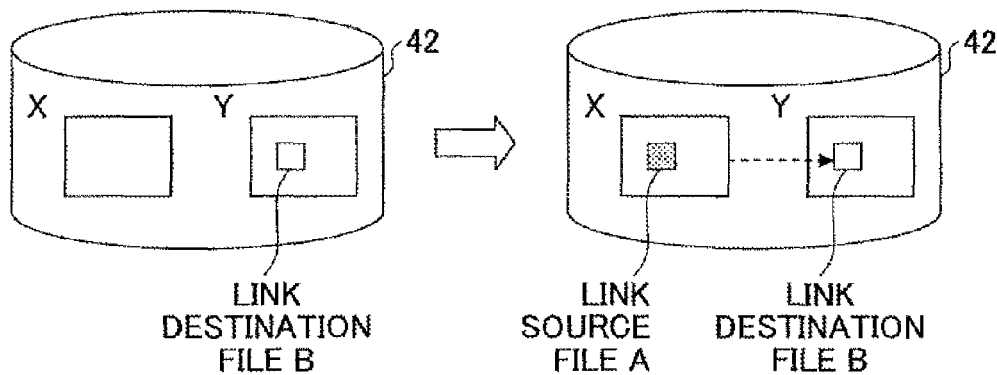
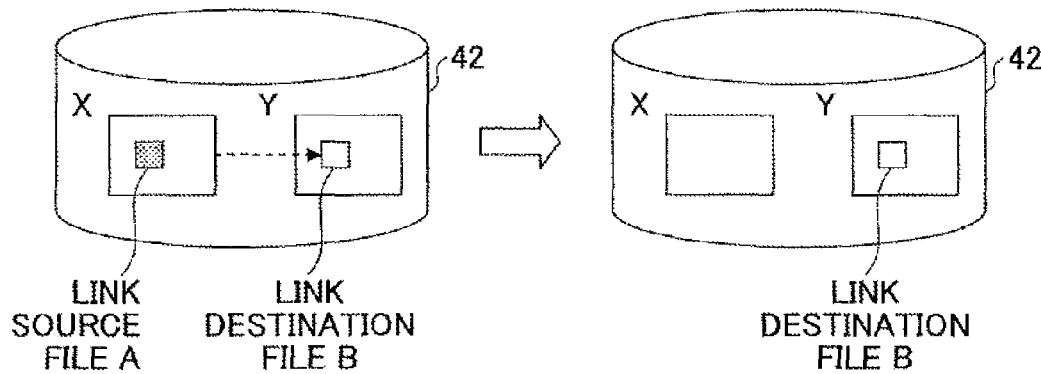

FIG.9
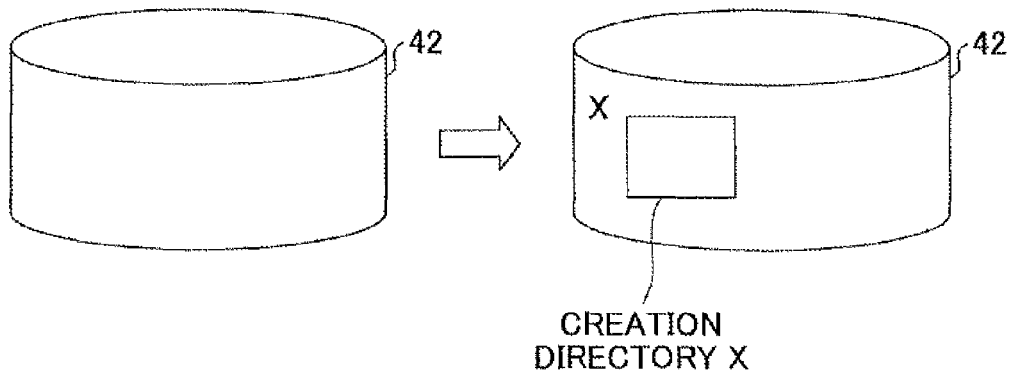
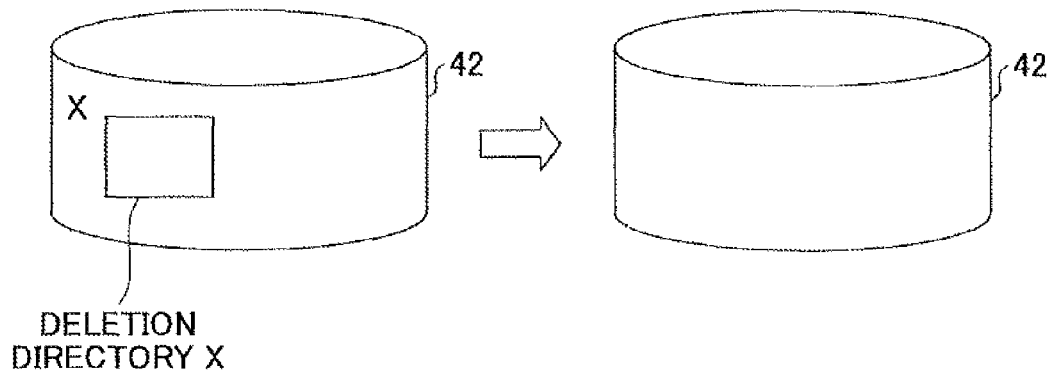

FIG.10
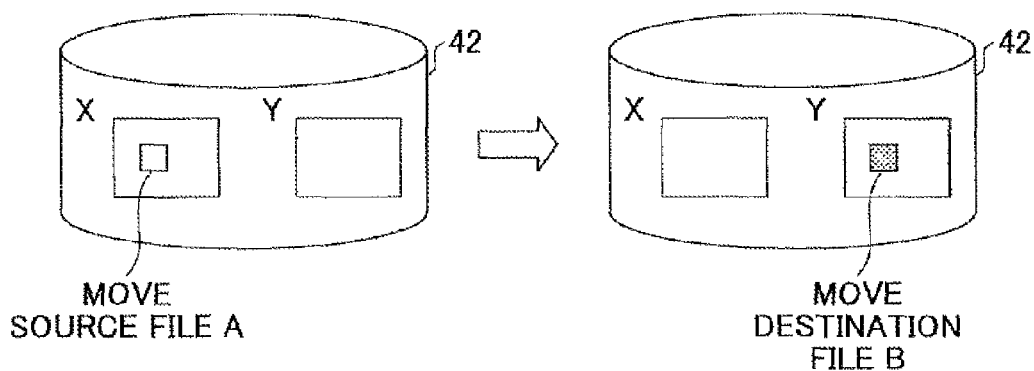
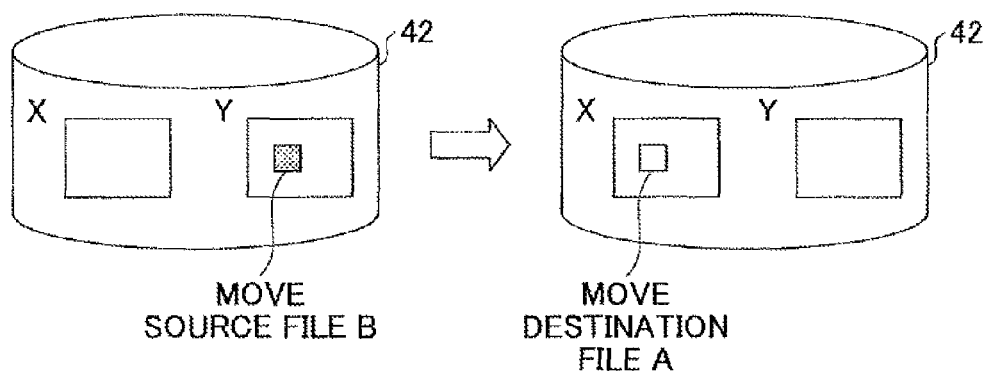

FIG.12
FORWARD OPERATION
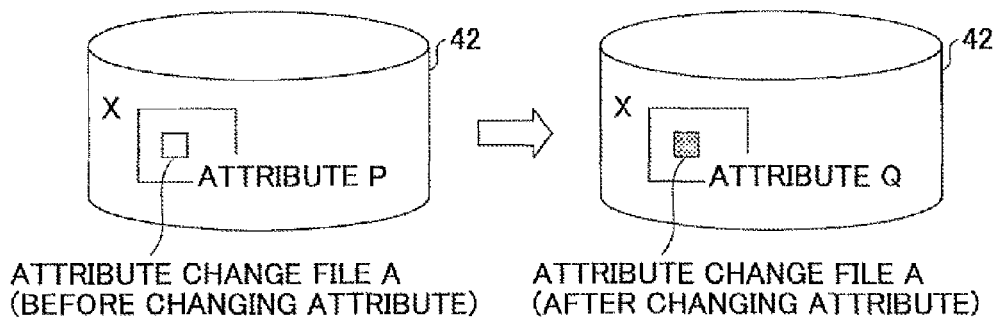
ATTRIBUTE CHANGE FILE A
(BEFORE CHANGING ATTRIBUTE)
ATTRIBUTE CHANGE FILE A
(AFTER CHANGING ATTRIBUTE)
BACKWARD OPERATION
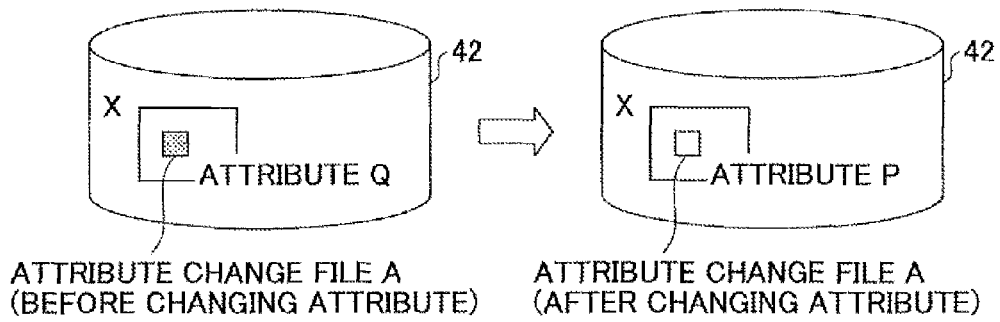
ATTRIBUTE CHANGE FILE A
(BEFORE CHANGING ATTRIBUTE)
ATTRIBUTE CHANGE FILE A
(AFTER CHANGING ATTRIBUTE)

FIG.13

FORWARD LOG

| OPERATION TYPES | OPERAND 1 | OPERAND 2 | OPERAND 3 |
|---|---|---|---|
| CREATE | CREATION FILE STORAGE DIRECTORY (X) | FILE (A) | |
| WRITE | UPDATE FILE STORAGE DIRECTORY (X) | FILE (A) | BLOCK NUMBER OF DATA AFTER UPDATE (1038) |
| REMOVE | DELETION FILE STORAGE DIRECTORY (X) | FILE (A) | |

BACKWARD LOG

| OPERATION TYPES | OPERAND 1 | OPERAND 2 | OPERAND 3 |
|---|---|---|---|
| REMOVE | DELETION FILE STORAGE DIRECTORY (X) | FILE (A) | |
| WRITE | UPDATE FILE STORAGE DIRECTORY (X) | FILE (A) | BLOCK NUMBER OF DATA BEFORE UPDATE (1059) |
| RECOVER | RECOVERY FILE STORAGE DIRECTORY (X) | FILE (A) | DELETION FILE |

FILE MANAGEMENT APPARATUS, METHOD, AND PROGRAM

CROSS-REFERENCE TO RELATED APPLICATIONS

This patent application is based upon and claims the benefit of priority of the prior Japanese Patent Application No. 2009-137665 filed on Jun. 8, 2009, the entire contents of which are incorporated herein by reference.

FIELD

The embodiments discussed herein are related to a file management apparatus, a file management method, a file management program and an information system.

BACKGROUND

In recent years, computers are indispensable to our daily lives, business of enterprises or the like. Disaster recovery (DR) techniques are important when computer systems are damaged by unexpected disasters.

With a typical disaster recovery technique, business data are sent at a certain check point from a primary site to a secondary site, which is positioned apart from the primary site. Thereafter, when various file operations are applied to the business data at the check point in the primary site, a log recording the file operations is transferred to the secondary site. When a disaster strikes the primary site, the business data having the file operations applied are written in the transferred log in the secondary site. Therefore, it is possible in the secondary site to recover the business data to have a relatively new arbitrary state. One of the disaster recovery techniques is, for example, realized by the product name "Double-Take" ("Double-Take" is a registered trademark), manufactured and distributed by Double-Take Software Incorporation.

SUMMARY

According to an aspect of the embodiment, there is provided a computer readable medium storing a computer program containing instructions executable by a processor to perform acquiring a forward log which includes forward file operations applied to files in an order of applying the forward file operations and is stored by a storage connected to the computer, extracting the forward file operations from the forward log in the order of applying the forward file operations, specifying generation rules for generating backward file operations from generation rule information, which includes the generation rules in association with the forward file operations, with reference to the extracted forward file operations, generating the backward file operations used for recovering from the files having the extracted forward file operations applied to files not having the extracted forward file operations applied in conformity with the specified generation rules, recording the generated backward file operations in a backward log in an order of generating the backward file operations, applying the extracted forward file operations to the files not having the extracted forward file operations applied, and reading the generated backward file operations from the backward log in an order reverse to the order of generating the backward file operations, and sequentially applying the read backward file operations to the files having the extracted forward file operations applied to recover the files not having the extracted forward file operations applied.

According to another aspect of the embodiment, there is provided an apparatus for recovering files, the apparatus including an acquiring unit configured to acquire a forward log which includes forward file operations applied to the files in an order of applying the forward file operations and is stored by a storage, an extracting unit configured to extract the forward file operations from the forward log in the order of applying the forward file operations, a specifying unit configured to specify generation rules for generating backward file operations from generation rule information, which includes the generation rules in association with the forward file operations, with reference to the extracted forward file operations, a generating unit configured to generate the backward file operations used for recovering from the files having the extracted forward file operations applied to files not having the extracted forward file operations applied in conformity with the specified generation rules, a recording unit configured to record the generated backward file operations in a backward log in an order of generating the backward file operations, an applying unit configured to apply the extracted forward file operations to the files not having the extracted forward file operations applied, and a recovering unit configured to read the generated backward file operations from the backward log in an order reverse to the order of generating the backward file operations, and to sequentially apply the read backward file operations to the files having the extracted forward file operations applied to recover the files not having the extracted forward file operations applied.

According to another aspect of the embodiment, there is provided a method of recovering files, the method including acquiring a forward log which includes forward file operations applied to the files in an order of applying the forward file operations and is stored by a storage, extracting the forward file operations from the forward log in the order of applying the forward file operations, specifying generation rules for generating backward file operations from generation rule information, which includes the generation rules in association with the forward file operations, with reference to the extracted forward file operations, generating the backward file operations used for recovering from the files having the extracted forward file operations applied to files not having the extracted forward file operations applied in conformity with the specified generation rules, recording the generated backward file operations in a backward log in an order of generating the backward file operations, applying the extracted forward file operations to the files not having the extracted forward file operations applied, and reading the generated backward file operations from the backward log in an order reverse to the order of generating the backward file operations, and sequentially applying the read backward file operations to the files having the extracted forward file operations applied to recover the files not having the extracted forward file operations applied.

According to another aspect of the embodiment, there is provided an information system apparatus including a primary site including a primary storage configured to stores files, and a primary server configured to apply forward file operations to the files, and a secondary site connected to the primary site via a network and including a secondary storage configured to store copy files obtained by duplicating the files, and a secondary server configured to apply the forward file operations transferred from the primary site to the copy files, wherein the secondary site includes an acquiring unit configured to acquire a forward log which includes the forward file operations applied to the files in an order of applying the forward file operations, an extracting unit configured to extract the forward file operations from the forward log in the order of applying the forward file operations, a specifying unit configured to specify generation rules for generating backward file operations from generation rule information, which includes the generation rules in association with the forward file operations, with reference to the extracted forward file operations, a generating unit configured to generate the backward file operations used for recovering from the copy files having the extracted forward file operations applied to files not having the extracted forward file operations applied in conformity with the specified generation rules, a recording unit configured to record the generated backward file operations in a backward log in an order of generating the backward file operations, an applying unit configured to apply the extracted forward file operations to the copy files not having the extracted forward file operations applied, and a recovering unit configured to read the generated backward file operations from the backward log in an order reverse to the order of generating the backward file operations, and to sequentially apply the read backward file operations to the copy files having the extracted forward file operations applied to recover the files not having the extracted forward file operations applied.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

FIG. 5 schematically illustrates a generation rule of the backward file operation corresponding to a CREATE operation of the embodiment;

FIG. 6 schematically illustrates a generation rule of the backward file operation corresponding to a WRITE operation of the embodiment;

FIG. 7 schematically illustrates a generation rule of the backward file operation corresponding to a REMOVE operation of the embodiment;

FIG. 8 schematically illustrates a generation rule of the backward file operation corresponding to a LINK operation of the embodiment;

FIG. 9 schematically illustrates a generation rule of the backward file operation corresponding to an MKDIR operation of the embodiment;

FIG. 10 schematically illustrates a generation rule of the backward file operation corresponding to a RENAME operation of the embodiment;

FIG. 12 schematically illustrates a generation rule of the backward file operation corresponding to a SETATTR operation of the embodiment;

FIG. 13 schematically illustrate a data structure of an example forward log and a data structure of an example backward log corresponding to the example forward log of the embodiment;

DESCRIPTION OF EMBODIMENT(S)

As described there is a disaster recovery technique using the product manufactured and distributed by Double-Take Software Incorporation.

However, in such a disaster recovery technique, it is difficult in principle to recover business data generated before a check point at which the business data are backed up. Therefore, in order to return to the oldest business data possible, old business data may have been backed up. In this case, many file operations may be applied to recover currently used business data. Then, a time for recovering the business data may be increased.

Meanwhile, it may be requested by a user to return from business data at a check point recovered by applying file operations recorded in a log up to the check point to business data slightly older than business data at the check point. In this case, file operations between the earliest file operation and a file operation at an intended point in the log may be applied to business data at the previous check point.

Therefore, it may be requested by the user to reduce time-consuming care by enabling to use the business data, to which the log is applied, to recover business data at an arbitrary past time point.

Preferred embodiments of the present invention will be explained with reference to accompanying drawings.

Figure 1:
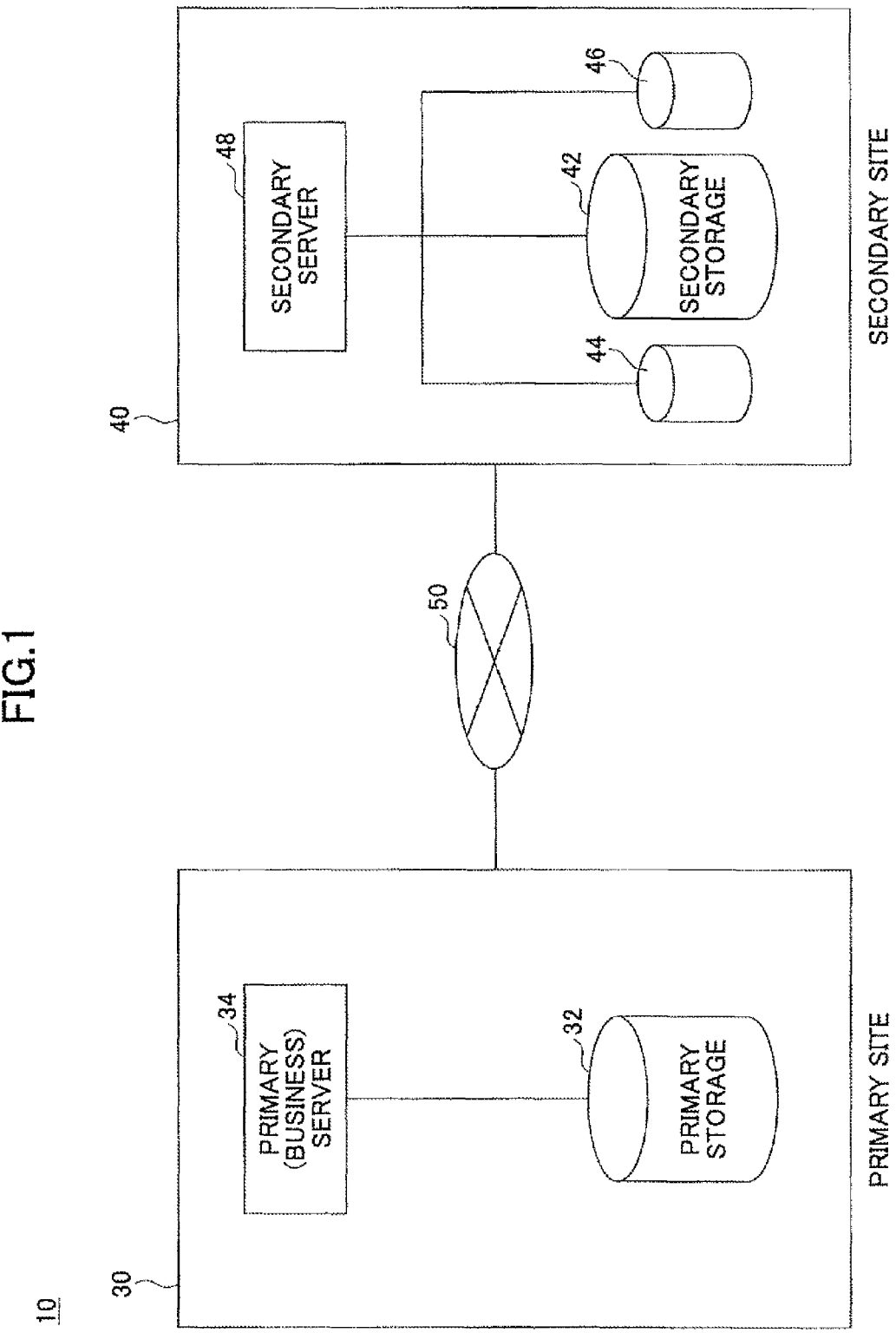
FIG. 1 is an example hardware configuration of an information system of an embodiment.

FIG. 1 is an example hardware configuration of an information system of an embodiment. Referring to FIG. 1, the information system 10 of the embodiment is described.

The information system 10 includes a primary site 30 and a secondary site 40, mutually connected via a network 50.

When various processes are requested to be applied to business data used in the information system, the primary site 30 typically works as a business site applying the requested various processes to the business data. The primary site 30 includes a primary storage 32 and a primary (business) server 34. The primary storage 32 stores various data including business data processed in the information system 10. The primary server 34 uses various applications to apply various processes to data stored in the primary storage 32.

The secondary site 40 is typically positioned apart from the primary site 30. When the primary site 30 is damaged at a time of disaster, the secondary site 40 becomes an alternative site. The secondary site 40 includes a secondary storage 42, a forward log disk 44, a backward log disk 46 and a secondary server 48.

Data at a certain time point in the primary storage 32, i.e. data at a certain check point, is sent to the secondary storage 42 from the primary site 30. Further, various file operations (CREATE, WRITE, REMOVE, etc.) of a forward log transferred from the primary site 30 via the network 50 and stored in the forward log disk 44 are applied to the data in the secondary storage 42.

The forward log disk 44 stores the various file operations (forward file operations) transferred from the primary site 30 to the secondary site 40 via the network 50 as a forward log. The forward log described below may be created by sequentially applying the various file operations to the files stored in the primary storage 32, and recording the various file operations in an order of application of the forward log from the head of the various file operations. The forward log may be generated by sequentially applying the various file operations to the files stored in the primary storage 32, and recording the various file operations sequentially in an order of applying the forward log.

The backward log disk 46 stores a backward log generated by a backward log generation process described below using the forward log stored in the forward log disk 44. Further, the backward log disk 46 may temporarily store data to be used in a data recovery process using the backward log generation process and the backward log.

The secondary server 48 uses various applications, and applies various processes to the data stored in the secondary storage 42. Further, the secondary server 48 uses a secondary agent to be described below to carry out the data recovery process using the backward log generation process and the generated backward log.

The network 50 may be an appropriate network connecting the primary site 30 to the secondary site 40. The network 50 may typically be a leased line network.

Figure 2:
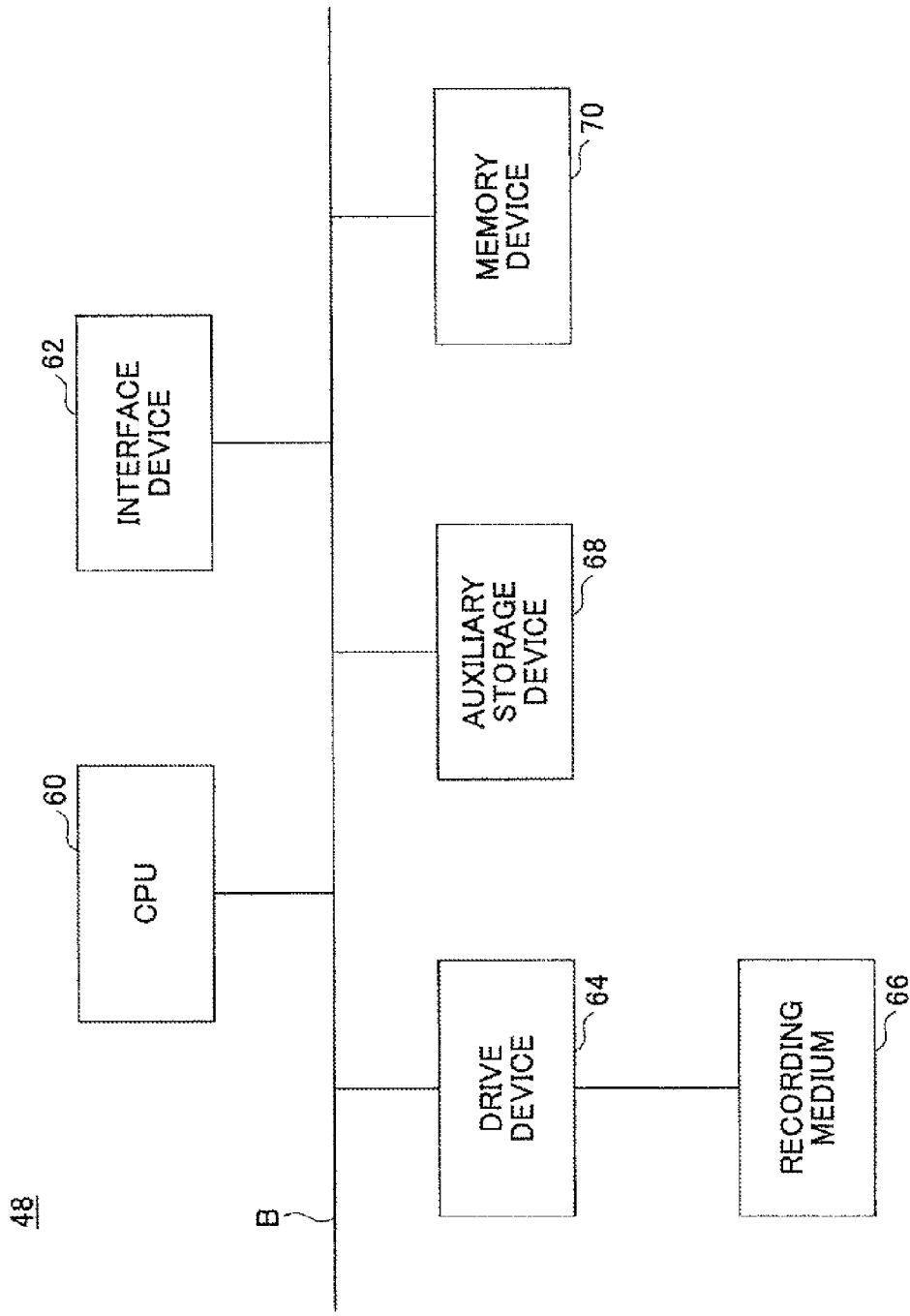
FIG. 2 is an example hardware configuration of a server of the embodiment.

FIG. 2 is an example hardware configuration of the server of the embodiment. Referring to FIG. 2, the hardware configurations of the primary server 34 and the secondary server 48 of the embodiment are described. The primary server 34 may have a hardware configuration similar to the secondary server 48. Therefore, description of the hardware configuration of the primary server 34 is omitted.

The secondary server 48 includes a central processing unit (CPU) 60, an interface device 62, a drive device 64, a non-transitory recording medium 66, an auxiliary storage device 68 and a memory device 70, which are mutually connected.

A program realizing the process in the secondary server 48 may be provided by a non-transitory recording medium such as a CD-ROM, ROM, RAM, HDD, or the like. After the non-transitory recording medium 66 having the program on it is mounted on the drive device 64, the program is installed in the auxiliary storage device 68 via the drive device 64 from the non-transitory recording medium 66. The auxiliary storage device 68 such as a hard disk drive (HDD) stores the installed program.

The memory device 70 loads the program received from the auxiliary storage device 68 in response to a start-up instruction for the program. The CPU 60 executes various functions of the secondary server 48 in conformity with the program loaded into the memory device 70. The interface device 62 is used as an interface for connecting the CPU 60, the drive device 64, the non-transitory recording medium 66, the auxiliary storage device 68 and the memory device 70 to the network 50 and other components of the secondary site 40.

Figure 3:
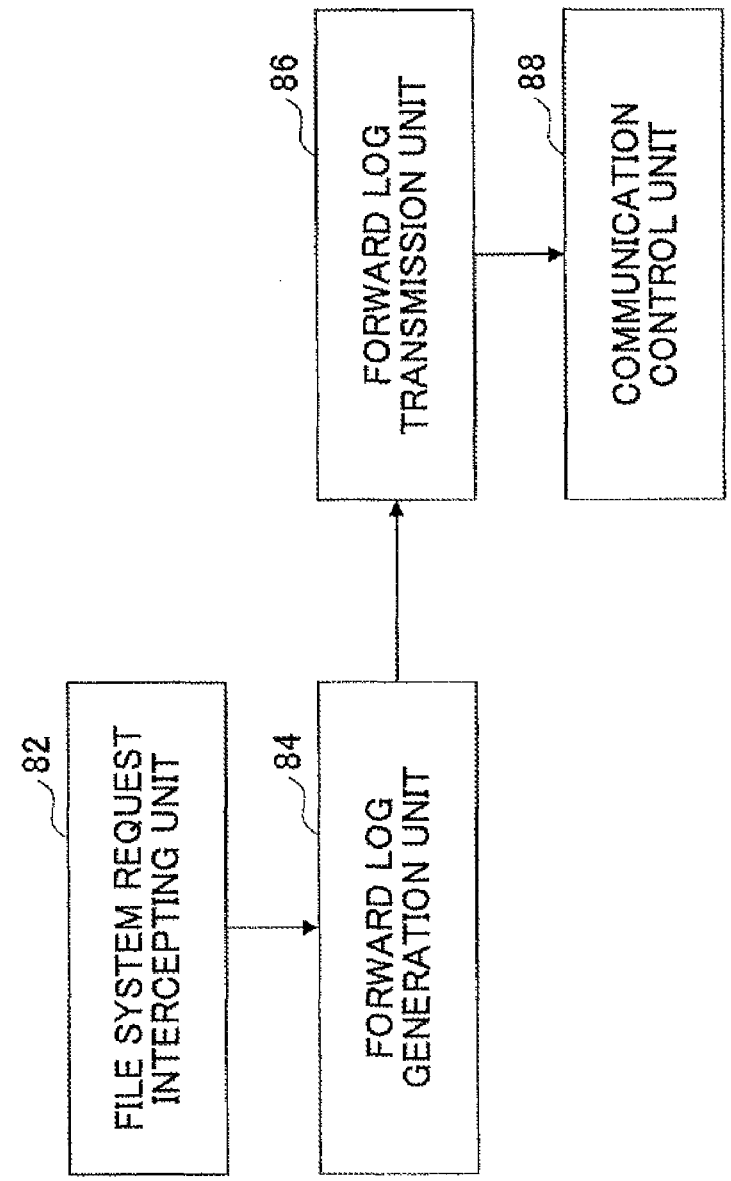
FIG. 3 schematically illustrates an example functional structure of a primary agent of the embodiment.

FIG. 3 schematically illustrates an example functional structure of a primary agent of the embodiment. Referring to FIG. 3, the functional structure of the primary agent of the primary site 30 of the embodiment is described.

The primary agent 80 is a function realized by the primary server 34 of the primary site 30. Specifically, the primary agent 80 detects various file operations carried out by the primary server 34 from the various files including the business data of the primary storage 32. The primary agent 80 generates a forward log including the file operations (forward file operations) and sends the forward log to the secondary site 40 via the network 50.

The primary agent 80 includes a file system request intercepting unit 82, a forward log generation unit 84, a forward log transmission unit 86 and a communication control unit 88. These various functional components are realized when the CPU 60 executes the program loaded into the memory device 70.

The file system request intercepting unit 82 detects various file operations (CREATE, WRITE, REMOVE, etc.) which are executed and applied to the various files including the business data stored in the primary storage 32 and executed by the primary server 34. Thereafter, the file system request intercepting unit 82 reports the detected various file operations to the forward log generation unit 84.

The terminology "file operation" may include not only the various operations of the files such as CREATE, WRITE and REMOVE but also various operations of directories such as MKDIR and RMDIR, etc. As described later, the various file operations use arguments predetermined in the file operations. For example, the CREATE operation uses two arguments "creation file storage directory" and "creation file", and the MKDIR operation uses one argument "creation directory". A file system request intercepting unit 82 detects various file operations using operation types of the file operations and values (operands) of the arguments, and reports the detected file operations to the forward log generation unit 84.

The forward log generation unit 84 generates a forward log from the various file operations including the operation types and operands received from the file system request intercepting unit 82. Specifically, the forward log generation unit 84 records the various file operations received from the file system request intercepting unit 82 in the forward log in an order of applying the file operations to the files in the primary storage 32 by the primary server 34. The recorded forward log may typically be stored in the auxiliary storage device 68 of the primary server 34. Thereafter, the forward log generation unit 84 provides the generated forward log to the forward log transmission unit 86.

The forward log generation unit 84 may cause a forward log stored in the auxiliary storage device 68 to be provided to the forward log transmission unit 86 at any appropriate timing. The forward log generation unit 84 may generate the forward log including the received file operations at every reception of the file operations from the file system request intercepting unit 82, and may provide the generated forward file logs to the forward log transmission unit 86. Alternatively, the forward log generation unit 84 may receive plural file operations from the file system request intercepting unit 82, generate the forward log including the plural file operations, and may provide the generated forward file log to the forward log transmission unit 86.

According to the first mode, the forward log generation unit 84 may have a counter (not illustrated) for counting the number of the received file operations. In the first mode, the forward log generation unit 84 may generate a forward log including a predetermined number of file operations after receiving the predetermined number of file operations from the file system request intercepting unit 82, and may provide the generated forward file log to the forward log transmission unit 86.

According to the second mode, the forward log generation unit 84 may have a timer (not illustrated). In the second mode, the forward log generation unit 84 may generate a forward log including file operations received from the file system request intercepting unit 82 during a predetermined time period, and may provide the generated forward file log to the forward log transmission unit 86. In any one of the first and second modes, the order of applying the file operations is maintained when the forward log is generated.

The forward log transmission unit 86 instructs the communication control unit 88 to send the forward log received from the forward log generation unit 84 to the secondary site 40 via the network 50.

The communication control unit 88 converts the received forward log to electronic data in conformity with any one of the communication types, and sends the electronic data to the secondary site 40 when the communication control unit 88 receives the transmission instruction from the forward log transmission unit 86. Further, the electronic data may have appropriate processes applied such as compression and encryption when necessary.

Figure 4:
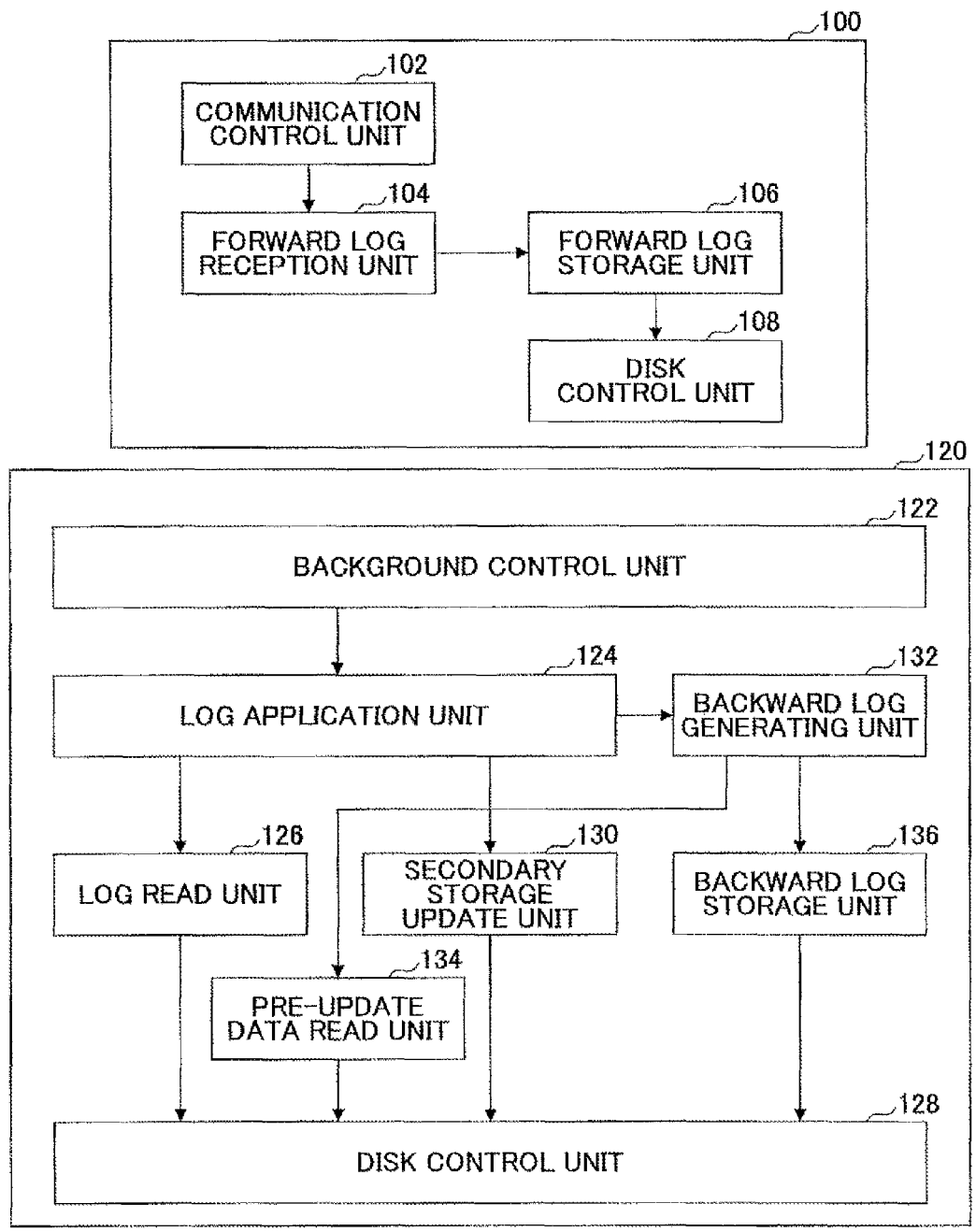
FIG. 4 schematically illustrates an example functional structure of a secondary agent of the embodiment.

FIG. 4 schematically illustrates an example functional structure of the secondary agent of the embodiment. Referring to FIG. 4, a functional structure of the secondary agent of the secondary site 40 of the embodiment is described.

The secondary agent 90 is a function realized by the secondary server 48 of the secondary site 40. Specifically, the secondary agent 90 stores a forward log received from the primary agent 80 into the forward log disk 44. In response to an instruction of applying the forward log, the secondary agent 90 extracts various file operations (forward file operations) from the forward log in the forward log disk 44. Thereafter, the secondary agent 90 applies the forward file operations to the data backed up in the secondary storage 42. When the forward file operations are applied, the secondary agent 90 generates backward file operations for restoring a file before having the forward file operations applied from the file having the forward file operations applied in conformity with a predetermined generation rule. After generating the backward file operations, the secondary agent 90 records the generated backward files in an order of generating the backward log.

The secondary agent 90 includes a forward log reception control component 100 and a background process component 120. These various functional components are realized when the CPU 60 executes the program loaded into the memory device 70.

The forward log reception control component 100 receives a forward log from the primary site 30 and stores the received forward log into the forward log disk 44. The forward log reception control component 100 includes a communication control unit 102, a forward log reception unit 104, a forward log storage unit 106 and a disk control unit 108.

The communication control unit 102 receives the forward log sent as electronic data from the primary site 30 via the network 50. Upon receipt of the electronic data, the communication control unit 102 decodes the received electronic data in response to a communication type, and provides the decoded data to the forward log reception unit 104.

After the forward log reception unit 104 receives the decoded data from the communication control unit 102, the forward log reception unit 104 extracts the forward log from the decoded data and provides it to the forward log storage unit 106.

The forward log storage unit 106 instructs the disk control unit 108 to store the forward log into the forward log disk 44 when the forward log storage unit 106 receives the forward log from the forward log reception unit 104.

The disk control unit 108 stores the forward log into the forward log disk 44 in response to the storage instruction issued from the forward log storage unit 106 instructing to store the forward log.

The background process component 120 extracts various file operations from the forward log in the forward log disk 44 in response to an application instruction for applying the forward log. Thereafter, the background process component 120 applies the forward file operations to the data backed up in the secondary storage 42. When the forward file operations are applied, the background process component 120 generates backward file operations, and records the generated backward file operations in the backward log.

The background process component 120 includes a background control unit 122, a log application unit 124, a log read unit 126, a disk control unit 128, a secondary storage update unit 130, a backward log generating unit 132, a pre-update data read unit 134 and a backward log storage unit 136.

The background control unit 122 controls various background processes carried out by the background process component 120. When the background control unit 122 receives an application instruction for the forward log, the background control unit 122 instructs the log application unit 124 to apply the forward log to the various files stored in the secondary storage 42, and instructs the backward log generating unit 132 to generate the backward log corresponding to the applied forward log. Further, when the background control unit 122 receives an application instruction for the generated backward log of applying the generated backward log to the file having the forward log applied, the background control unit 122 instructs the log application unit 124 to apply the backward log to the various files having the forward log applied and stored in the secondary storage 42.

The log application unit 124 instructs the log read unit 126 to extract the forward log stored in the forward log disk 44 in response to a forward log application instruction issued by the background control unit 122. Thereafter, the log application unit 124 applies various file operations (CREATE, WRITE, REMOVE, MKDIR, RMDIR, etc.) of the extracted forward log in the order of applying the file operations to data of the secondary storage 42, and instructs the secondary storage update unit 130 to update various files stored in the secondary storage 42. For example, when the various file operations in the forward log are sequentially described in the order of applying the file operations to the various files in the primary storage 32 from the head of the forward log, the log application unit 124 may sequentially apply the file operations from the head.

Specifically, the log application unit 124 extracts the first file operation in the order of applying the file operations from the forward log. The log application unit 124 specifies the operation types (CREATE, WRITE, REMOVE, etc.) of the extracted file operation and values (operands) of the arguments corresponding to the operation types. Then, the log application unit 124 provides the file operation including the specified operation type and operands to the backward log generating unit 132. Thereafter, the log application unit 124 applies the extracted file operation to the secondary storage 42, and causes the secondary storage update unit 130 to update the various files in the secondary storage 42.

Thereafter, the log application unit 124 extracts the second file operation in the order of applying the file operations to the various files from the forward log, and carries out the process as described above. In a similar manner thereto, the log application unit 124 repeats the processes to the other file operations in the forward file log.

The log read unit 126 acquires the forward log stored in the forward log disk 44 via the disk control unit 128 in response to a read instruction for the forward log issued from the log application unit 124 as described above. The log read unit 126 acquires the backward log stored in the backward log disk 46 via the disk control unit 128 in response to the read instruction for the backward log issued from the log application unit 124.

The disk control unit 128 reads the files and log stored in the secondary storage 42, the forward log disk 44 and the backward log disk 46, and writes the files and log into the secondary storage 42, the forward log disk 44 and the backward log disk 46.

When the secondary storage update unit 130 receives an update instruction using the files having the log applied from the log application unit 124, the file not having the log applied is updated by the file having the log applied.

When the backward log generating unit 132 receives the forward file operations from the log application unit 124, the backward log generating unit 132 refers to predetermined generation rule information of backward file operations stored in the auxiliary storage device 68, and generates backward file operations corresponding to the received forward file operations. The backward log generating unit 132 instructs the backward log storage unit 136 to record the generated backward file operations in the backward log in an order of generating the generated backward file operations.

Said differently, the log application unit 124 sequentially reads forward file operations from the forward log in the order of applying the forward log, and sequentially provides the read forward file operations to the backward log generating unit 132. When the backward log generating unit 132 receives the forward log operations, the backward file operations corresponding to the forward file operations are sequentially generated and recorded in the backward log in the order of generation. Therefore, the order of operating the backward files (the order of generating the backward files) recorded in the backward log becomes the same as the order of the forward file operations (the order of applying the forward file operations) recorded in the forward log in correspondence with the backward file operations.

When original data before applying the forward file operations are required to be retained in generating the backward file operations such as a WRITE operation, a REMOVE operation and a SETATTR operation describe below, the original data which are not updated are read out of the secondary storage 42 via the disk control unit 128, and temporarily retained in the backward log disk 46 or the like.

The backward log storage unit 136 stores the generated backward log in the backward log disk 46 via the disk control unit 128.

FIG. 5 schematically illustrates a generation rule of a backward file operation corresponding to a forward CREATE operation of the embodiment. Referring to FIG. 5, the generation rule of the backward file operation corresponding to the CREATE operation of the embodiment is described.

Typically, the CREATE operation is to create a designated file in a designated directory. Said differently, the CREATE operation uses "creation file storage directory" and "creation file" as arguments.

Referring to the upper half of FIG. 5, a generation process of the backward file operation corresponding to the forward CREATE operation is described. Referring to the upper left and the upper right of FIG. 5, the secondary storages 42 before and after applying the forward CREATE operation are schematically illustrated, respectively.

Referring to the upper left of FIG. 5, the secondary storage 42 has directory X in it before applying the forward CREATE operation with the log application unit 124. When the log application unit 124 extracts the forward CREATE operation from the forward log in the forward log disk 44 using the log read unit 126, the log application unit 124 specifies the operation type of "CREATE" related to the extracted forward CREATE operation and the two operands of "creation file storage directory X" and "creation file A" related to the operation type of "CREATE".

When the operation type and the operands related to the operation type are specified, the log application unit 124 reports to the backward log generating unit 132 that the extracted forward file operation is the CREATE operation using the creation file storage directory X and the creation file A.

When the backward log generating unit 132 receives the report from the log application unit 124, the backward log generating unit 132 generates the backward file operation corresponding to the forward CREATE operation with reference to the generation rule information of the backward file operation stored in the auxiliary storage device 68.

Specifically, the generation rule information of the backward file operation has a generation rule which defines generation of a backward REMOVE operation including the operands of "deletion file storage directory X" and "deletion file A" based on the forward CREATE operation including the operands of "creation file storage directory X" and "creation file A". The REMOVE operation is to delete the file A from the directory X of the secondary storage 42.

With the embodiment illustrated in FIG. 5, the backward log generating unit 132 generates a backward REMOVE operation using operands of "deletion file storage directory X" and "deletion file A" based on the received forward CREATE operation in conformity with the generation rule of the backward file operation. Then, the backward log generating unit 132 records the generated backward REMOVE operation into the backward log in the backward log disk 46 using the backward log storage unit 136 in the order of the generation.

Next, referring to the lower half of FIG. 5, a recovery process of applying the backward REMOVE operation, which corresponds to the forward CREATE operation, to the secondary storage 42 having the forward CREATE operation applied is described. Referring to the lower left and lower right of FIG. 5, the secondary storages 42 not having and having the backward REMOVE operation applied using the operands of "deletion file storage directory X" and "deletion file A" are schematically illustrated.

Referring to the lower left of FIG. 5, the secondary storage 42 after the forward CREATE operation is applied as in the upper right of FIG. 5 is illustrated. In the recovery process, the log application unit 124 applies the backward REMOVE operation using the operands of "deletion file storage directory X" and "deletion file A" to the secondary storage 42 having the forward CREATE operation applied. When the backward REMOVE operation is applied, the secondary storage 42 in the upper left of FIG. 5 before applying the forward operation is recovered as illustrated in the lower right of FIG. 5.

FIG. 6 schematically illustrates a generation rule of a backward file operation corresponding to a WRITE operation of the embodiment. Referring to FIG. 6, the generation rule of the backward file operation corresponding to the WRITE operation of the embodiment is described.

Typically, the WRITE operation is to update designated data in a designated file in a designated directory. The WRITE operation uses arguments of "update file storage directory X", "update file A" and "update data T".

Referring to the upper half of FIG. 6, a generation process of the backward file operation corresponding to the forward WRITE operation is described. Referring to the upper left and the upper right of FIG. 6, the secondary storages 42 not having and having the forward WRITE operation applied are schematically illustrated, respectively. These secondary storages 42 include operands of "update file storage directory X", "update file A" and "update data T".

Referring to the upper left of FIG. 6, the secondary storage 42 has data S in file A of directory X in it before applying the forward WRITE operation with the log application unit 124. When the log application unit 124 extracts the forward WRITE operation from the forward log in the forward log disk 44 using the log read unit 126, the log application unit 124 specifies the operation type of "WRITE" related to the extracted forward WRITE operation and the three operands of "update file storage directory X", "update file A" and "update data T" related to the operation type of "WRITE".

When the operation type and the operands related to the operation type are specified, the log application unit 124 reports to the backward log generating unit 132 that the extracted forward file operation is the WRITE operation using the update file storage directory X, the update file A and the update data T.

When the backward log generating unit 132 receives the report from the log application unit 124, the backward log generating unit 132 generates a backward file operation corresponding to the forward WRITE operation with reference to the generation rule information of the backward file operation stored in the auxiliary storage device 68.

Specifically, the generation rule information of the backward file operation has a generation rule which defines generation of a backward WRITE operation including operands of "update file storage directory X", "update file A" and "update data S" based on the forward WRITE operation including the operands of "update file storage directory X", "update file A" and "update data S". The update data S are data which do not have the forward WRITE operation applied.

With the embodiment illustrated in FIG. 6, the backward log generating unit 132 generates a backward WRITE operation using operands of "update file storage directory X", "update file A" and "update data S" based on the received forward WRITE operation in conformity with the generation rule of the backward file operation. Then, the backward log generating unit 132 records the generated backward WRITE operation into the backward log in the backward log disk 46 using the backward log storage unit 136 in the order of the generation. Further, the backward log generating unit 132 makes the pre-update data read unit 134 read original data S and store the read original data S in a backward log of the backward log disk 46 before the forward WRITE operation is applied to the secondary storage 42.

When the original data S to have the backward WRITE operation applied are stored in the backward log disk 46, the entire file A using the data S may be recorded in the backward log disk 46. However, the original data S are a part of the file A. Therefore, it may be possible to store only the original data S of the file A, which are to be actually updated, in order to save the storage capacity of the backward log disk 46. In this case, the update data S may be designated using a block number at which the storage of the update data S starts in the secondary storage 42 and an offset (number of blocks) between the block number and a block number at which the storage of the update data S ends in the secondary storage 42, for example.

Next, referring to the lower half of FIG. 6, a recovery process of applying the backward WRITE operation, which corresponds to the forward WRITE operation, to the secondary storage 42 having the forward CREATE operation applied is described. Referring to the lower left and the lower right of FIG. 6, secondary storages 42 not having and having the backward WRITE operation applied are schematically illustrated, respectively. These secondary storages 42 include operands of "update file storage directory X", "update file A" and "update data S".

Referring to the lower left of FIG. 6, the secondary storage 42 after the forward WRITE operation is applied as in the upper right of FIG. 6 is illustrated. In the recovery process, the log application unit 124 applies the backward WRITE operation using the operands of "update file storage directory X", "update file A" and "update data S" to the secondary storage 42 having the forward WRITE operation applied. When the backward WRITE operation is applied, the secondary storage 42 in the upper left of FIG. 6 before applying the forward operation is recovered as illustrated in the lower right of FIG. 6.

FIG. 7 schematically illustrates a generation rule of backward file operation corresponding to a REMOVE operation of the embodiment. Referring to FIG. 7, the generation rule of the backward file operation corresponding to the REMOVE operation of the embodiment is described.

As described above, the REMOVE operation is typically an operation of deleting a designated file on a designated directory. Said differently, the REMOVE operation uses "deletion file storage directory" and "deletion file" as arguments.

Referring to the upper half of FIG. 7, a generation process of the backward file operation corresponding to a forward REMOVE operation is described. Referring to the upper left and upper right of FIG. 7, the secondary storages 42 not having and having the forward REMOVE operation applied using the operands of "deletion file storage directory X" and "deletion file A" are schematically illustrated, respectively.

Referring to the upper left of FIG. 7, the secondary storage 42 has file A in directory X in it before applying the forward REMOVE operation with the log application unit 124. When the log application unit 124 extracts the forward REMOVE operation from the forward log in the forward log disk 44 using the log read unit 126, the log application unit 124 specifies the operation type of "REMOVE" related to the extracted forward REMOVE operation and two operands "deletion file storage directory X" and "deletion file A" related to the operation type of "REMOVE".

When the operation type and the operands related to the operation type are specified, the log application unit 124 reports to the backward log generating unit 132 that the extracted forward file operation is the REMOVE operation concerning the deletion file storage directory X and the deletion file A.

When the backward log generating unit 132 receives the report from the log application unit 124, the backward log generating unit 132 generates a backward file operation corresponding to the forward REMOVE operation with reference to the generation rule information of the backward file operation stored in the auxiliary storage device 68.

Specifically, the generation rule information of the backward file operation has a generation rule of the backward file operation which defines a backward RECOVER operation using operands of "recovery file storage directory X", "recovery file A" and "deletion file R", i.e. a generation rule of the backward file operation defining generation of a backward RENAME operation using four operands of "move source directory G", "move source file R", "move destination directory X" and "move destination file A", based on the forward REMOVE operation using the operands of "deletion file storage directory X" and "deletion file A". The directory G is a special directory for temporarily storing the file R.

The RECOVER operation is to recover the file R in the directory G in the secondary storage 42 as the file A in the directory X. The RENAME operation is substantially equivalent to the RECOVER operation. The RENAME operation is to move the file R in the directory G to the directory X as the file A.

The log application unit 124 does not actually apply the REMOVE operation when the forward REMOVE operation uses operands of "deletion file storage directory X" and "deletion file A". The log application unit 124 applies the forward RENAME operation using four operands of "move source directory X", "move source file A", "move destination directory G" and "move destination file R".

In the backward file operation generation process related to a forward WRITE operation for temporarily retaining original data S, the original data S are stored in the back log disk 46. However, during the backward file operation generation process related to a forward REMOVE operation, the original file F before having the forward REMOVE operation applied is stored in the special directory G in the secondary storage 42 as described above. Because the file A ordinarily has the data amount larger than that of the data S, it is not preferable to store the file A into the back log disk 46 in consideration of efficient use of the back log disk 46. However, the file A may be stored in the back log disk 46 in the third mode in which the back log disk 46 has a sufficient storage capacity. Said differently, it is preferable that the file A to be removed by the forward REMOVE operation is stored in any portion of any storage when the backward RENAME operation corresponding to the forward RENAME operation is applied to the secondary storage 42.

In the embodiment illustrated in FIG. 7, the backward log generating unit 132 generates, in response to the received forward REMOVE operation in conformity with the generation rule of backward file operation, a backward RECOVER operation using operands of "recovery file storage directory X", "recovery file A" and "deletion file R", and a backward RENAME operation using operands of "move source directory G", "move source file R", "move destination directory X" and "move destination file A". Then, the backward log generating unit 132 records the generated backward RECOVER operation or the generated backward RENAME operation into the backward log in the backward log disk 46 using the backward log storage unit 136 in the order of generating the backward RECOVER operation or the backward RENAME operation.

There is described, referring to the lower half of FIG. 7, a recovery process of applying the backward RECOVER operation or the backward RENAME operation, which correspond to the forward REMOVE operation or the forward RENAME operation, to the secondary storage 42 having the backward RECOVER operation applied or the forward RENAME operation applied as described above. Referring to the lower left and lower right of FIG. 7, the secondary storages 42 not having and having the backward RECOVER operation applied using the operands of "recovery file storage directory X", "recovery file A" and "deletion file R", or the backward RENAME operation using the operands of "move source directory G", "move source file R", "move destination directory X" and "move destination file A", are schematically illustrated, respectively.

Referring to the lower left of FIG. 7, the secondary storage 42 after the forward REMOVE operation is applied as in the upper right of FIG. 7 is illustrated. In the recovery process, the log application unit 124 applies the backward RECOVER operation including the operands of "recovery file storage directory X", "recovery file A" and "deletion file R", or the backward RENAME operation including the operands of "move source directory G", "move source file R", "move destination directory X" and "move destination file A" to the secondary storage 42 having the forward RENAME operation applied. When the backward RECOVER operation or the backward RENAME operation is applied, the secondary storage 42 in the upper left of FIG. 7 before having the forward operation applied is recovered as illustrated in the lower right of FIG. 7.

FIG. 8 schematically illustrates a generation rule of a backward file operation corresponding to a LINK operation of the embodiment. Referring to FIG. 8, the generation rule of the backward file operation corresponding to the LINK operation of the embodiment is described.

Typically, the LINK operation links a designated file in a designated directory further to another designated directory. Specifically, a pointer information file designating the file in one directory is created in the other designated directory. The LINK operation uses arguments of "link source directory", "link source file (pointer information file)", "link destination directory" and "link destination file".

Referring to the upper half of FIG. 8, a generation process of the backward file operation corresponding to the forward LINK operation is described. Referring to the upper left and the upper right of FIG. 8, the secondary storages 42 not having and having forward the LINK operation applied including operands of "link source directory X", "link source file A", "link destination directory Y" and "link destination file B" are schematically illustrated, respectively.

Referring to the upper left of FIG. 8, the secondary storage 42 has file B in directory Y in it before applying the forward LINK operation with the log application unit 124. When the log application unit 124 extracts the forward LINK operation from the forward log in the forward log disk 44 using the log read unit 126, the log application unit 124 specifies the operation type of "LINK" related to the extracted forward LINK operation and four operands "link source directory X", "link source file A", "link destination directory Y" and "link destination file B".

When the operation type and the operands related to the operation type are specified, the log application unit 124 reports to the backward log generating unit 132 that the extracted forward file operation is the forward LINK operation using the operands of "link source directory X", "link source file A", "link destination directory Y" and "link destination file B".

When the backward log generating unit 132 receives the report from the log application unit 124, the backward log generating unit 132 generates a backward file operation corresponding to the forward LINK operation with reference to generation rule information of the backward file operation stored in the auxiliary storage device 68.

Specifically, the generation rule information of the backward file operation has a generation rule of the backward file operation which defines generation of the backward REMOVE operation including operands of "link source directory X", "link source file A", "link destination directory Y" and "link destination file B". The file A is a pointer information file of the directory X designating the file B as described above. In the backward REMOVE operation, the link between the link source directory X and the link destination file B is released by removing the pointer information file A.

With the embodiment, the backward log generating unit 132 generates the backward REMOVE operation including operands of "deletion file storage directory X" and "deletion file A" based on the received forward LINK operation in conformity with the generation rule of the backward file operation. Then, the backward log generating unit 132 records the generated backward REMOVE operation into the backward log in the backward log disk 46 using the backward log storage unit 136 in the order of the generation.

Next, referring to the lower half of FIG. 8, a recovery process of applying the backward REMOVE operation, which corresponds to the forward LINK operation, to the secondary storage 42 having the forward LINK operation applied is described. Referring to the lower left and lower right of FIG. 8, the secondary storages 42 not having and having the backward REMOVE operation applied including the operands of "deletion file storage directory X" and "deletion file A" are schematically illustrated, respectively.

Referring to the lower left of FIG. 8, the secondary storage 42 after the forward LINK operation is applied as in the upper right of FIG. 8 is illustrated. In the recovery process, the log application unit 124 applies the backward REMOVE operation using the operands of "delete file storage directory X" and "deletion file A" to the secondary storage 42 having the forward LINK operation applied. When the backward REMOVE operation is applied, the secondary storage 42 in the upper left of FIG. 8 before applying the forward operation is recovered as illustrated in the lower right of FIG. 8.

FIG. 9 schematically illustrates a generation rule of a backward file operation corresponding to a MKDIR operation of the embodiment. Referring to FIG. 9, the generation rule of the backward file operation corresponding to the MKDIR operation of the embodiment is described.

Typically, the MKDIR operation is to create a designated directory in a storage. Said differently, the MKDIR operation uses an argument of "creation directory".

Referring to the upper half of FIG. 9, a generation process of the backward file operation corresponding to the forward MKDIR operation is described. Referring to the upper left and the upper right of FIG. 9, the secondary storages 42 not having and having the forward MKDIR operation applied using the operand of "creation directory X" are schematically illustrated, respectively.

Referring to the upper left of FIG. 9, the log application unit 124 specifies an operation type as "MKDIR" related to the extracted forward MKDIR and the operand as "creation directory X" related to the operation type of "MKDIR" when the log application unit 124 extracts the forward MKDIR operation from the forward log in the forward log disk 44 using the log read unit 126.

When the operation type and the operand related to the operation type are specified, the log application unit 124 reports to the backward log generating unit 132 that the extracted forward file operation is the MKDIR operation using the operand of "creation directory X".

When the backward log generating unit 132 receives the report from the log application unit 124, the backward log generating unit 132 generates a backward file operation corresponding to the forward MKDIR operation with reference to the generation rule information of the backward file operation stored in the auxiliary storage device 68.

Specifically, the generation rule information of the backward file operation includes a generation rule of the backward file operation which defines generation of the backward RMDIR operation using an operand of "deletion directory X" from the forward MKDIR operation using the operand of "creation directory X". The backward RMDIR operation is to delete the directory X from the secondary storage 42.

With the embodiment illustrated in FIG. 8, the backward log generating unit 132 generates the backward RMDIR operation including the operand of "deletion directory X" based on the received forward MKDIR operation in conformity with the generation rule of the backward file operation. Then, the backward log generating unit 132 records the generated backward RMDIR operation into the backward log in the backward log disk 46 using the backward log storage unit 136 in the order of the generation.

Next, referring to the lower half of FIG. 9, a recovery process of applying the backward RMDIR operation, which corresponds to the forward MKDIR operation, to the secondary storage 42 having the forward MKDIR operation applied is described. Referring to the lower left and the lower right of FIG. 9, the secondary storages 42 not having and having the backward RMDIR operation applied including the operand of "deletion directory X" are schematically illustrated, respectively.

Referring to the lower left of FIG. 9, the secondary storage 42 after the forward MKDIR operation is applied as in the upper right of FIG. 9 is illustrated. In the recovery process, the log application unit 124 applies the backward RMDIR operation using the operand of "deletion directory X" to the secondary storage 42 having the forward MKDIR operation applied. When the backward RMDIR operation is applied, the secondary storage 42 in the upper left of FIG. 9 before having the forward operation applied is recovered as illustrated in the lower right of FIG. 9.

FIG. 10 schematically illustrates a generation rule of a backward file operation corresponding to a RENAME operation of the embodiment. Referring to FIG. 10, the generation rule of the backward file operation corresponding to the RENAME operation of the embodiment is described.

As described in the above, the RENAME operation is typically to move a move source file in a designated move source directory to a move destination file in a designated move destination directory. The RENAME operation includes arguments of "move source directory", "move source file", "move destination directory" and "move destination file". The move source file and the move destination file may have an identical name. Then, the move source file is moved from the move source directory to the move destination directory while maintaining its file name. The move source directory and the move destination directory may be an identical directory. In this case, the file name of the move source file is changed to a file name for a different move destination file inside the above identical directory.

Referring to the upper half of FIG. 10, a generation process of the backward file operation corresponding to the forward RENAME operation is described. Referring to the upper left and the upper right of FIG. 10, the secondary storages 42 not having and having the forward RENAME operation applied including operands of "move source directory X", "move source file A", "move destination directory Y" and "move destination file B" are schematically illustrated, respectively.

Referring to the upper left of FIG. 10, the secondary storage 42 has file A in directory X in it before applying the forward RENAME operation with the log application unit 124. When the log application unit 124 extracts the forward RENAME operation from the forward log in the forward log disk 44 using the log read unit 126, the log application unit 124 specifies the operation type as "REMOVE" related to the extracted forward RENAME operation and four operands "move source directory X", "move source file A", "move destination directory Y" and "move destination file B" related to the operation type of "RENAME".

When the operation type and the operands related to the operation type are specified, the log application unit 124 reports to the backward log generating unit 132 that the extracted forward file operation is the forward RENAME operation using the operands of "move source directory X", "move source file A", "move destination directory Y" and "move destination file B".

When the backward log generating unit 132 receives the report from the log application unit 124, the backward log generating unit 132 generates a backward file operation corresponding to the forward RENAME operation with reference to the generation rule information of the backward file operation stored in the auxiliary storage device 68.

Specifically, the generation rule information of the backward file operation includes a generation rule of the backward file operation which defines generation of the backward RENAME operation using operands of "move source directory Y", "move source file B", "move destination directory X" and "move destination file A" from the forward RENAME operation including operands of "move source directory X", "move source file A", "move destination directory Y" and "move destination file B".

In the embodiment illustrated in FIG. 10, the backward log generating unit 132 generates, in response to the received forward RENAME operation in conformity with the generation rule of the backward file operation, the backward RENAME operation using the operands of "move source directory Y", "move source file B", "move destination directory X" and "move destination file A". Then, the backward log generating unit 132 records the generated backward RENAME operation into the backward log in the backward log disk 46 using the backward log storage unit 136 in the order of the generation.

Next, referring to the lower half of FIG. 10, a recovery process of applying the backward RENAME operation, which corresponds to the forward RENAME operation, to the secondary storage 42 having the forward RENAME operation applied is described. Referring to the lower left and the lower right of FIG. 10, the secondary storages 42 not having and having the forward RENAME operation applied using the operands of "move source directory Y", "move source file B", "move destination directory X" and "move destination file A" are schematically illustrated, respectively.

Referring to the lower left of FIG. 10, the secondary storage 42 after the forward RENAME operation is applied as in the upper right of FIG. 10 is illustrated. In the recovery process, the log application unit 124 applies the backward RMDIR operation using the operands of "move source directory Y", "move source file B" and "move destination file A" to the secondary storage 42 having the forward RENAME operation applied. When the backward RENAME operation is applied, the secondary storage 42 in the upper left of FIG. 10 before applying the forward operation is recovered as illustrated in the lower right of FIG. 10.

Figure 11:
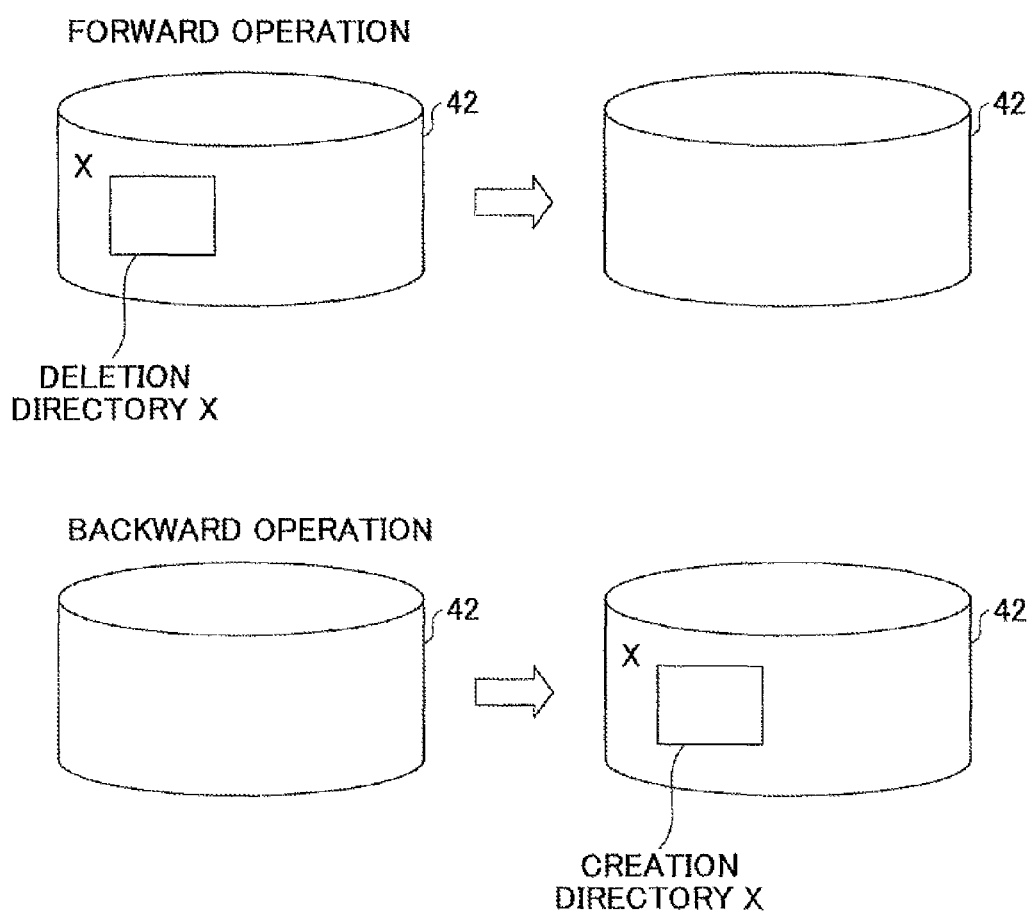
FIG. 11 schematically illustrates a generation rule of the backward file operation corresponding to a RMDIR operation of the embodiment.

FIG. 11 schematically illustrates a generation rule of a backward file operation corresponding to an RMDIR operation of the embodiment. Referring to FIG. 11, the generation rule of the backward file operation corresponding to the RMDIR operation of the embodiment is described.

As described above, the RMDIR operation is typically an operation of deleting a designated directory from the storage. Said differently, the RMDIR operation uses an argument of "deletion directory".

Referring to the upper half of FIG. 11, a generation process of the backward file operation corresponding to a forward RMDIR operation is described. Referring to the upper left and the upper right of FIG. 11, the secondary storages 42 not having and having the forward RMDIR operation applied using an operand of "deletion directory X" are schematically illustrated, respectively.

Referring to the upper left of FIG. 11, the secondary storage 42 has directory X in it before applying the forward RMDIR operation with the log application unit 124. The log application unit 124 specifies an operation type as "RMDIR" related to the extracted forward RMDIR and an operand as "deletion directory X" related to the operation type of "RMDIR" when the log application unit 124 extracts the forward RMDIR operation from the forward log in the forward log disk 44 using the log read unit 126.

When the operation type and the operand related to the operation type are specified, the log application unit 124 reports to the backward log generating unit 132 that the extracted forward file operation is the forward RMDIR operation using the operand of "deletion directory X".

When the backward log generating unit 132 receives the report from the log application unit 124, the backward log generating unit 132 generates the backward file operation corresponding to the forward RMDIR operation with reference to the generation rule information of the backward file operation stored in the auxiliary storage device 68.

Specifically, the generation rule information of the backward file operation includes a generation rule of the backward file operation which defines generation of a backward MKDIR operation including an operand of "creation directory X" from the forward MKDIR operation including an operand of "deletion directory X".

With the embodiment illustrated in FIG. 11, the backward log generating unit 132 generates backward the MKDIR operation using the operand of "creation directory X" based on the received forward RMDIR operation in conformity with the generation rule of the backward file operation. Then, the backward log generating unit 132 records the generated backward MKDIR operation into the backward log disk 46 using the backward log storage unit 136 in the order of the generation.

Next, referring to the lower half of FIG. 11, a recovery process of applying the backward MKDIR operation, which corresponds to the forward RMDIR operation, to the secondary storage 42 having the forward RMDIR operation applied is described. Referring to the lower left and the lower right of FIG. 11, the secondary storages 42 not having and having the backward MKDIR operation applied using the operand of "creation directory X" are schematically illustrated, respectively.

Referring to the lower left of FIG. 11, the secondary storage 42 after the forward RMDIR operation is applied as in the upper right of FIG. 11 is illustrated. In the recovery process, the log application unit 124 applies the backward MKDIR operation using the operand of "deletion directory X" to the secondary storage 42 having the forward RMDIR operation applied. When the backward MKDIR operation is applied, the secondary storage 42 in the upper left of FIG. 11 before applying the forward operation is recovered as illustrated in the lower right of FIG. 11.

FIG. 12 schematically illustrates a generation rule of a backward file operation corresponding to a SETATTR operation of the embodiment. Referring to FIG. 12, the generation rule of the backward file operation corresponding to the SETATTR operation of the embodiment is described.

Typically, the SETATTR operation is to change the file attribute of a designated file in a designated directory. Said differently, the SETATTR operation uses arguments of "attribute change storage directory", "attribute change file" and "attribute".

Referring to the upper half of FIG. 12, a generation process of the backward file operation corresponding to a forward SETATTR operation is described. Referring to the upper left and the upper right of FIG. 12, the secondary storages 42 not having and having the forward SETATTR operation applied using operands of "attribute change file storage directory X", "attribute change file A" and "attribute Q" are schematically illustrated, respectively.

Referring to the upper left of FIG. 12, the secondary storage 42 has an attribute P related to file A of directory X before applying the forward SETATTR operation with the log application unit 124. When the log application unit 124 extracts the forward SETATTR operation from the forward log in the forward log disk 44 using the log read unit 126, the log application unit 124 specifies the operation type as "SETATTR" related to the extracted forward SETATTR operation and the three operands of "attribute change file storage directory X", "attribute change file A" and "attribute Q" related to the operation type of "SETATTR".

When the operation type and the operands related to the operation type are specified, the log application unit 124 reports to the backward log generating unit 132 that the extracted forward file operation is the forward SETATTR operation using the operands of "attribute change file storage directory X", "attribute change file A" and "attribute Q".

When the backward log generating unit 132 receives the report from the log application unit 124, the backward log generating unit 132 generates the backward file operation corresponding to the forward SETATTR operation with reference to the generation rule information of the backward file operation stored in the auxiliary storage device 68.

Specifically, the generation rule information of the backward file operation includes a generation rule of the backward file operation which defines generation of the backward SETATTR operation using the operands of "attribute change file storage directory X", "attribute change file A" and "attribute P" from the forward SETATTR operation using the operands of "attribute change file storage directory X", "attribute change file A" and "attribute Q". The "attribute P" is an original attribute which does not have the forward SETATTR operation applied.

With the embodiment, the backward log generating unit 132 generates the backward SETATTR operation including the operands of "attribute change file storage directory X", "attribute change file A" and "attribute P" based on the received forward SETATTR operation in conformity with the generation rule of the backward file operation. Then, the backward log generating unit 132 records the generated backward SETATTR operation into the backward log disk 46 using the backward log storage unit 136 in the order of the generation. Further, the backward log generating unit 132 stores the original attribute P of the secondary storage 42 into a backward log in the backward log disk 46 using the pre-update data read unit 134 before the forward SETATTR operation is applied to the secondary storage 42.

Next, referring to the lower half of FIG. 12, a recovery process of applying the backward SETATTR operation, which corresponds to the forward SETATTR operation, to the secondary storage 42 having the forward SETATTR operation applied is described. Referring to the lower left and the lower right of FIG. 12, the secondary storages 42 not having and having the backward SETATTR operation applied using the operands of "attribute change file storage directory X", "attribute change file A" and "attribute P" are schematically illustrated, respectively. Referring to the lower left of FIG. 12, the secondary storage 42 after the forward SETATTR operation is applied as in the upper right of FIG. 12 is illustrated. In the recovery process, the log application unit 124 applies the backward SETATTR operation using the operands of "attribute change file storage directory X", "attribute change file A" and "attribute P" to the secondary storage 42 having the forward SETATTR operation applied. When the backward SETATTR operation is applied, the secondary storage 42 in the upper left of FIG. 12 before applying the forward operation is recovered as illustrated in the lower right of FIG. 12.

Referring to FIG. 13, a data structure of the backward log is described. FIG. 13 schematically illustrate a data structure of an example forward log and a data structure of an example backward log corresponding to the example forward log of the embodiment.

As illustrated in FIG. 13, the forward log and the backward log relate to one or more file operations. The file operations use the one or more arguments previously defined in association with the file operations. For example, the CREATE operation uses the two arguments of "creation file storage directory" and "creation file". For example, the WRITE operation uses the arguments of "update file storage directory", "update file" and "update data". Names of directories to be processed may be designated for the arguments of "creation file storage directory" and "update file storage directory". Names (identification) of directories to be processed may be designated for the arguments of "creation file storage directory" and "update file storage directory". Names (identification like A and B) of files to be processed may be designated for the arguments of "creation file" and "update file". As to the argument of "update data", a storage start block number after updating data may be designated together with an offset (number of blocks) between the storage start block number after updating the data and a storage end block number after updating the data.

A forward log is generated by the primary server 34 so that the order of applying various file operations to the business data in the primary storage 32 is known in the primary site 30. Specifically, as illustrated in the upper half of FIG. 13, CREATE, WRITE and REMOVE operations applied to the business data in the primary storage 32 may be written from the head of the forward log in the order of applying these operations.

On the other hand, the backward log has backward file operations generated relative to the file operations which are written in the forward log, in conformity with the above-mentioned generation rule of the backward file operations. As described, the backward file operations are generated relative to the forward file operations, and the backward file operations are sequentially recorded into the backward log. Referring to a data structure illustrated in the lower half of FIG. 13, the backward file operations of REMOVE, WRITE and RECOVER corresponding to the forward file operations of CREATE, WRITE and REMOVE are written from the head of the backward log in the order of generating the backward file operations. Said differently, the order of applying the forward file operations written in the forward log is the same as the order of generating the backward file operations described in the backward log.

On the other hand, when data at any check point are recovered from the data having the forward file operations applied using the backward log, the log application unit 132 applies the backward file operations in the order reverse to the order of generating the backward file operations. Referring to the backward log in FIG. 13, the backward file operations are applied from RECOVER positioned at the bottom toward REMOVE positioned at the head.

Figure 14:
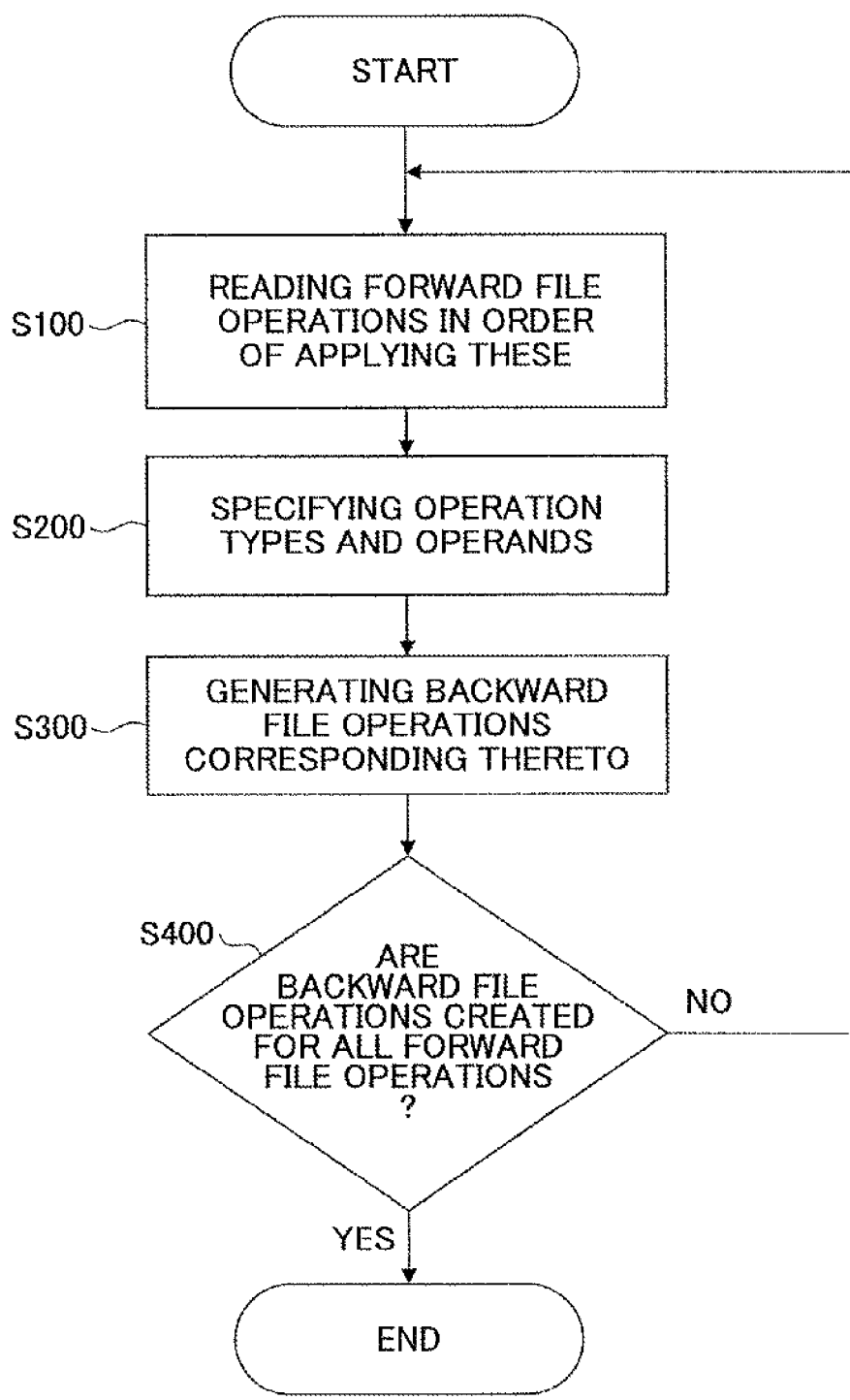
FIG. 14 is an example flowchart of a backward log generation process of the embodiment.

Referring to FIG. 14, a backward log generation process of the embodiment is described. FIG. 14 is an example flowchart of the backward log generation process of the embodiment.

When the background process component 120 is instructed to apply the forward log to current data backed up in the secondary storage 42, the backward log generation process starts.

In step S100, the log application unit 124 acquires the forward log from the forward log disk 44 using the log read unit 126, and reads the forward file operations recorded in the forward log in the order of applying the forward file operations.

In step S200, the log application unit 124 specifies operation types and operands based on the read forward file operations. Then, the log application unit 124 reports the specified operation types and operands to the backward log generating unit 132.

In step S300, the backward log generating unit 132 refers to the generation rule of the backward file operation, which is related to the reported operation types and operands of the forward file operation and stored in the auxiliary storage device 68, and generates a backward file operation corresponding to the forward file operation of the reported operation types and operands in conformity with the generation rule of the backward file operation. The backward log generating unit 132 records the generated backward file operations into the backward log in the backward log disk 46 in the order of generating the backward file operations.

In step S400, the log application unit 124 determines whether the backward file operations corresponding to all of the acquired forward file operations are generated. When the backward file operations corresponding to all of the acquired forward file operations are generated in YES of step S400, the backward log generation process ends. Meanwhile, when there is no backward file operation corresponding to at least one of the forward file operations in NO of step S400, the process goes to step S100 to generate the backward file operation corresponding to the one of the forward file operations. In this way, the above process in FIG. 14 is repeated for all the forward file operations.

Referring to FIG. 15 to FIG. 22, the backward file operation generation processes of step S300 are described with respect to various file operations described above.

Figure 15:
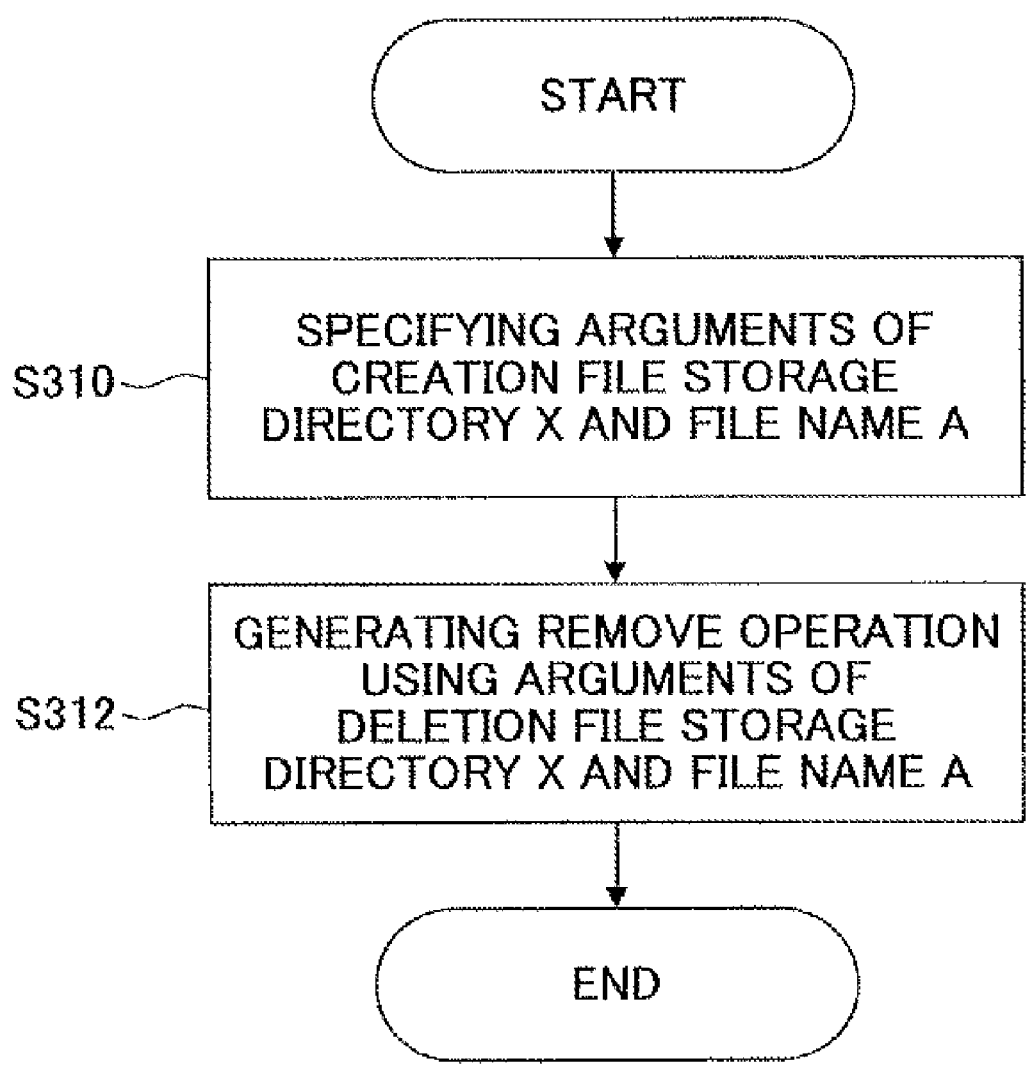
FIG. 15 is an example flowchart of the backward file operation generation process corresponding to a forward CREATE operation of the embodiment.

FIG. 15 is an example flowchart of the backward file operation generation process corresponding to the forward CREATE operation of the embodiment.

It is assumed in step S200 that the log application unit 124 specifies that the forward file operation read by the log read unit 126 is the forward CREATE operation using operands of "creation file storage directory X" and "creation file A", and reports the forward CREATE operation to the backward log generating unit 132. In response to the report, the backward log generating unit 132 starts the backward file operation generation process corresponding to the forward CREATE operation in step S300.

In step S310, the backward log generating unit 132 specifies that the received forward CREATE operation uses the operands of "creation file storage directory X" and "creation file A".

In step S312, the backward log generating unit 132 refers to the generation rule information of the backward file operation stored in the auxiliary storage device 68, and specifies the generation rule of the backward file operation corresponding to the forward CREATE operation. Thereafter, the backward log generating unit 132 generates the operands of "deletion file storage directory X" and "deletion file A" in conformity with the generation rule of backward file operation.

Figure 16:
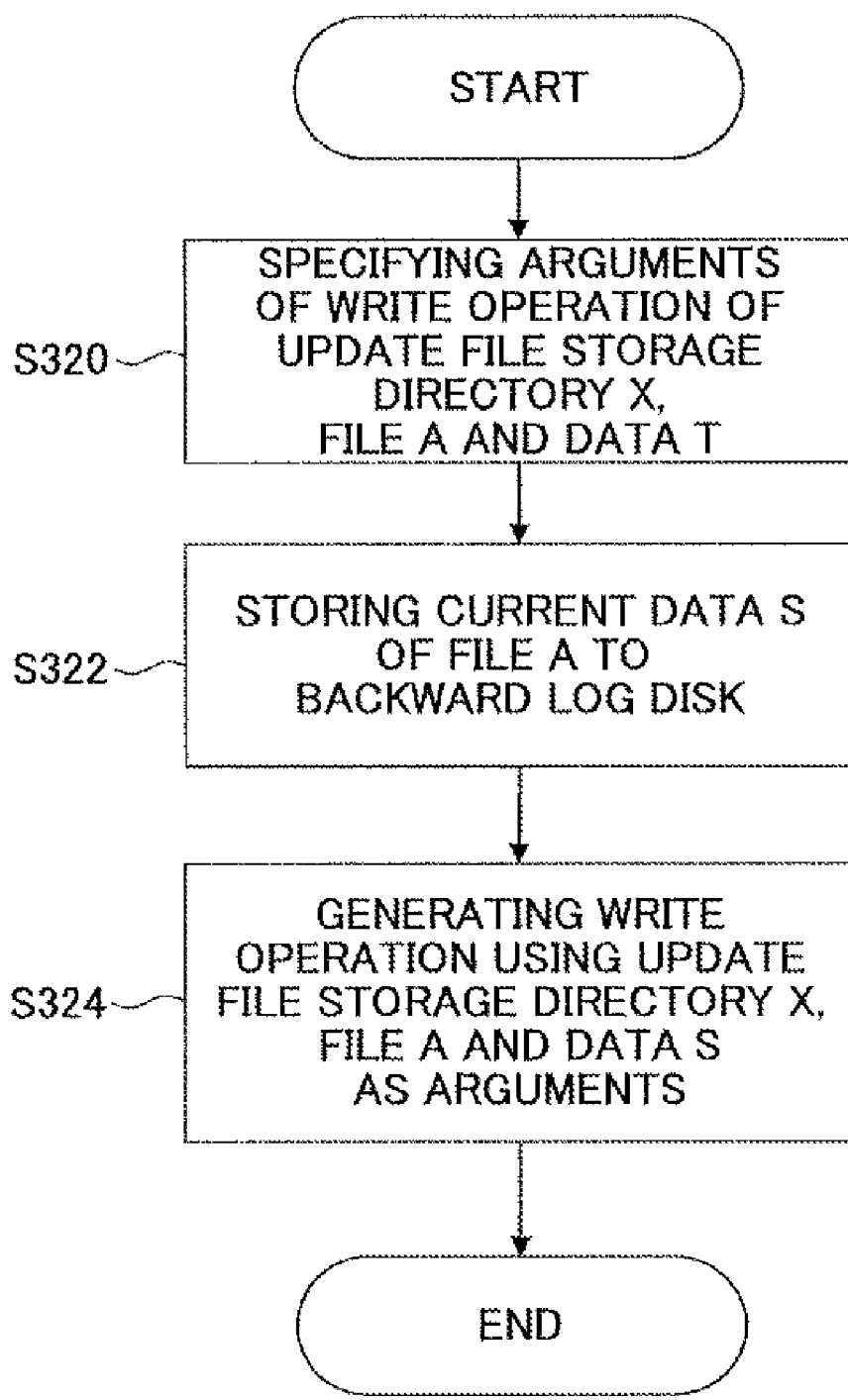
FIG. 16 is an example flowchart of the backward file operation generation process corresponding to a forward WRITE operation of the embodiment.

FIG. 16 is an example flowchart of the backward file operation generation process corresponding to the forward WRITE operation of the embodiment.

It is assumed in step S200 that the log application unit 124 specifies that the forward file operation read by the log read unit 126 is the forward WRITE operation using operands of "update file storage directory X", "update file A" and "update data T", and reports the forward WRITE operation to the backward log generating unit 132. In response to the report, the backward log generating unit 132 starts the backward file operation generation process corresponding to the forward WRITE operation in step S300.

In step S320, the backward log generating unit 132 specifies that the received forward WRITE operation uses the operands of "update file storage directory X", "update file A" and "update data T".

In step S322, the backward log generating unit 132 determines original data S to be replaced by the update data T in the file A. Then, the backward log generating unit 132 stores the original data S to be replaced by the update data T into the backward log disk 46 using the disk control unit 128.

In step S324, the backward log generating unit 132 refers to the generation rule information of the backward file operation stored in the auxiliary storage device 68, and specifies the generation rule of the backward file operation corresponding to the forward WRITE operation. Thereafter, the backward log generating unit 132 generates the backward WRITE operation using operands of "update file storage directory X", "update file A" and "update data S" in conformity with the generation rule of backward file operation.

Figure 17:
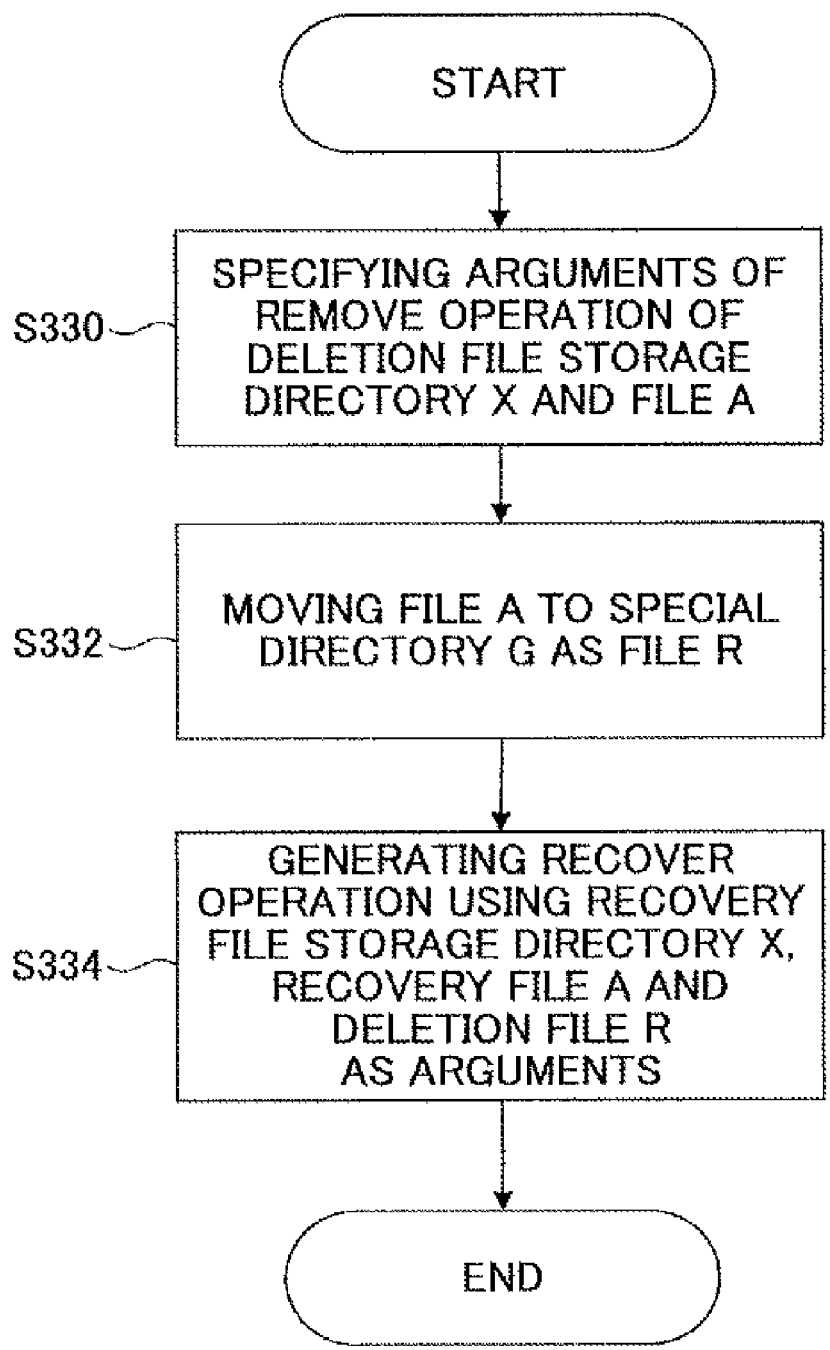
FIG. 17 is an example flowchart of the backward file operation generation process corresponding to a forward REMOVE operation of the embodiment.

FIG. 17 is a flowchart of the backward file operation generation process corresponding to a forward REMOVE operation of the embodiment.

It is assumed in step S200 that the log application unit 124 specifies that the forward file operation read by the log read unit 126 is the forward REMOVE operation using the operands of "deletion file storage directory X" and "deletion file A", and reports the forward REMOVE operation to the backward log generating unit 132. In response to the report, the backward log generating unit 132 starts the backward file operation generation process corresponding to the forward REMOVE operation in step S300.

In step S330, the backward log generating unit 132 specifies that the received forward REMOVE operation uses the operands of "deletion file storage directory X" and "deletion file A".

Is step S332, the backward log generating unit 132 moves file A of directory X as file R into directory G specially provided in the secondary storage 42 using the pre-update data read unit 134.

In step S334, the backward log generating unit 98 refers to the generation rule information of the backward file operation stored in the auxiliary storage device 68, and specifies the generation rule of the backward file operation corresponding to the forward REMOVE operation. Thereafter, the backward log generating unit 132 generates the backward RECOVER operation using operands of "recovery file storage directory X", "recovery file A" and "deletion file R" in conformity with the specified generation rule of backward file operation. As described, the backward RECOVER operation may be realized as a RENAME operation using operands of "move source directory G", "move source file R", "move destination directory X" and "move destination file".

Figure 18:
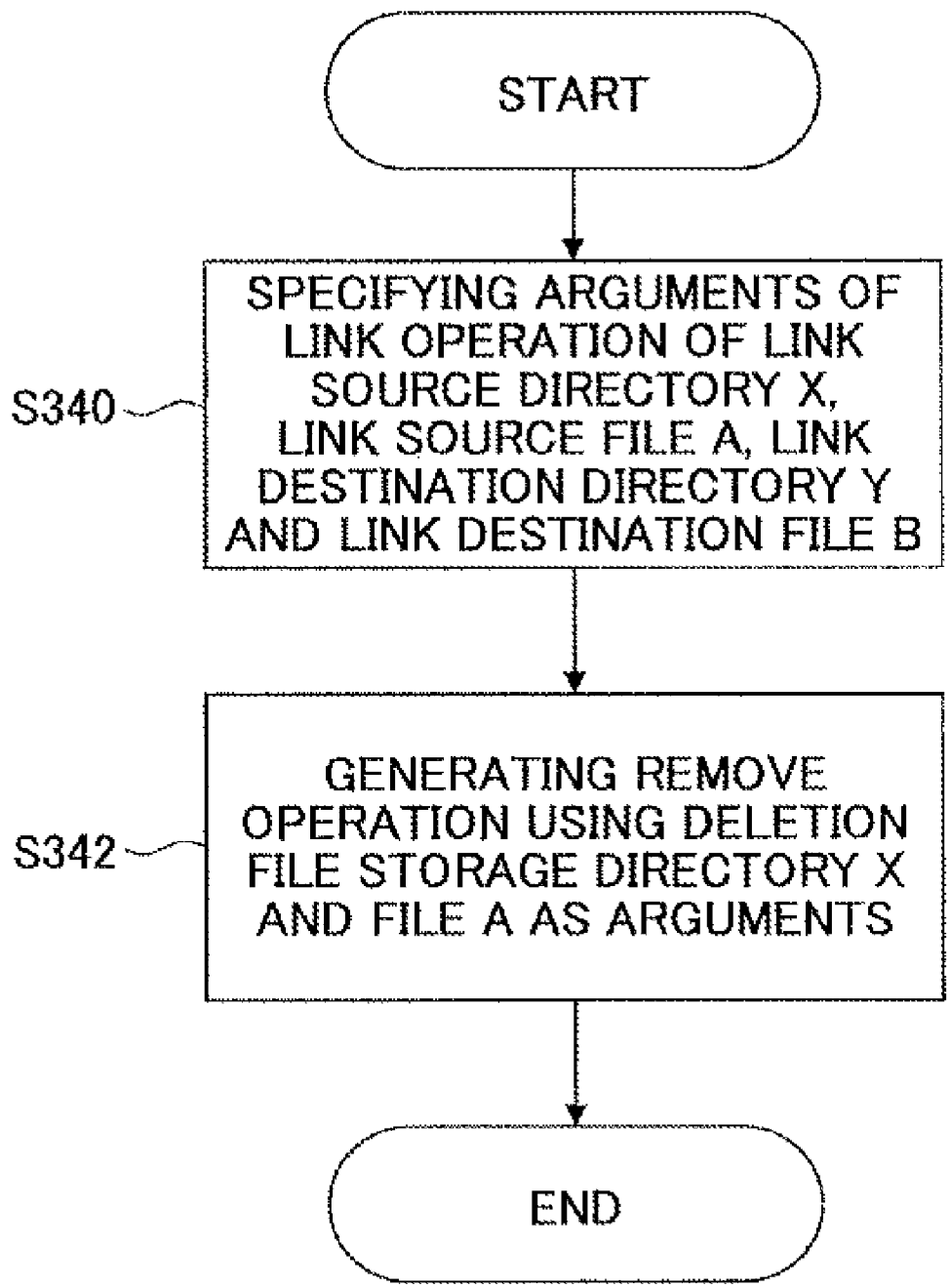
FIG. 18 is an example flowchart of the backward file operation generation process corresponding to a forward LINK operation of the embodiment.

FIG. 18 is an example flowchart of the backward file operation generation process corresponding to the forward LINK operation of the embodiment.

It is assumed in step S200 that the log application unit 124 specifies that the forward file operation read by the log read unit 126 is a forward LINK operation using operands of "link source directory X", "link source file A", "link destination directory Y" and "link destination file B", and reports the forward LINK operation to the backward log generating unit 132. In response to the report, the backward log generating unit 132 starts the backward file operation generation process corresponding to the forward LINK operation in step S300.

In step S340, the backward log generating unit 132 specifies that the received forward LINK operation uses the operands of "link source directory X", "link source file A", "link destination directory Y" and "link destination file B".

In step S342, the backward log generating unit 132 refers to the generation rule information of the backward file operation stored in the auxiliary storage device 68, and specifies a generation rule of the backward file operation corresponding to the forward CREATE operation. Thereafter, the backward log generating unit 132 generates operands of "deletion file storage directory X" and "deletion file A" in conformity with the specified generation rule of backward file operation. As described, the file A is a pointer information file designating the file B in the directory X.

Figure 19:
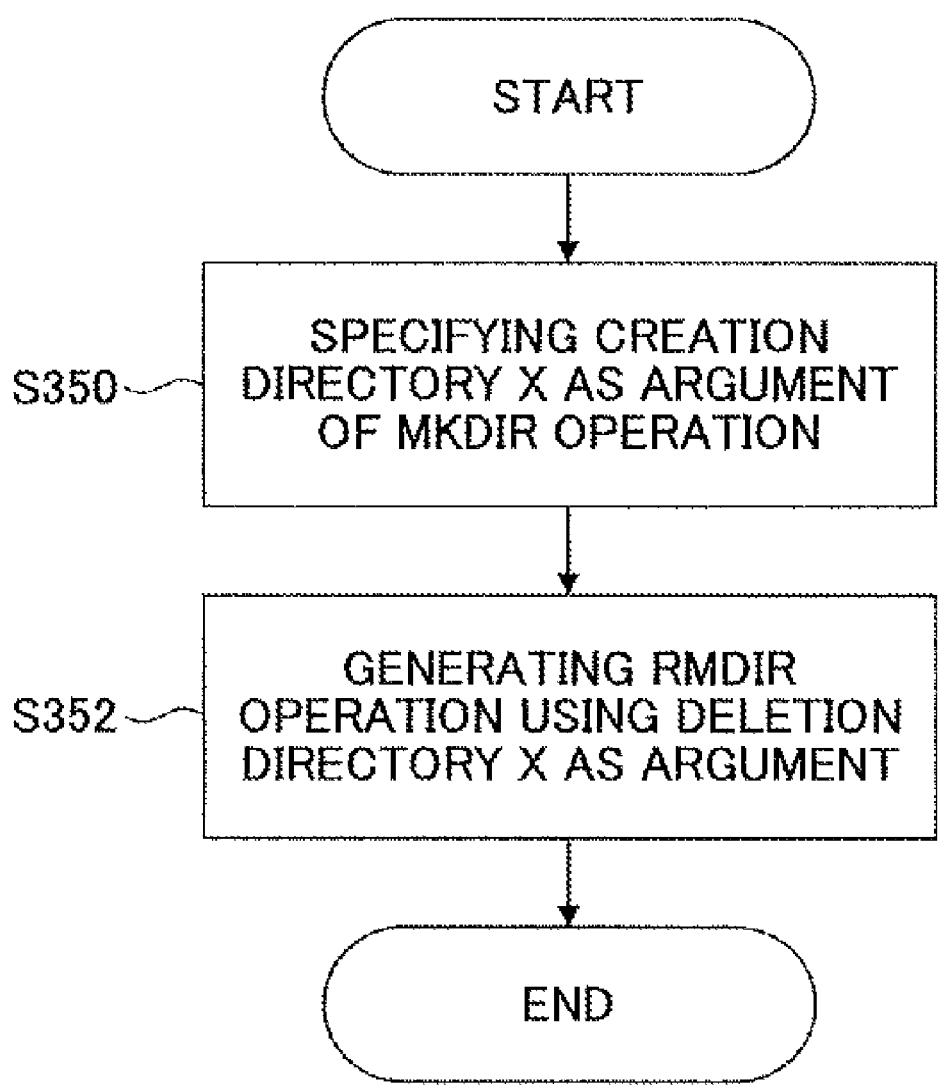
FIG. 19 is an example flowchart of the backward file operation generation process corresponding to a forward MKDIR operation of the embodiment.

FIG. 19 is an example flowchart of a backward file operation generation process corresponding to the forward MKDIR operation of the embodiment.

It is assumed in step S200 that the log application unit 124 specifies that the forward file operation read by the log read unit 126 is the forward MKDIR operation using an operand of "creation directory X", and reports the forward MKDIR operation to the backward log generating unit 132. In response to the report, the backward log generating unit 132 starts the backward file operation generation process corresponding to the forward MKDIR operation in step S300.

In step S350, the backward log generating unit 132 specifies that the received MKDIR operation uses the operand of "creation directory X".

In step S352, the backward log generating unit 132 refers to the generation rule information of the backward file operation stored in the auxiliary storage device 68, and specifies the generation rule of the backward file operation corresponding to the forward MKDIR operation. Thereafter, the backward log generating unit 132 generates the backward RMDIR operation using the operand of "deletion directory X" in conformity with the specified generation rule of backward file operation.

Figure 20:
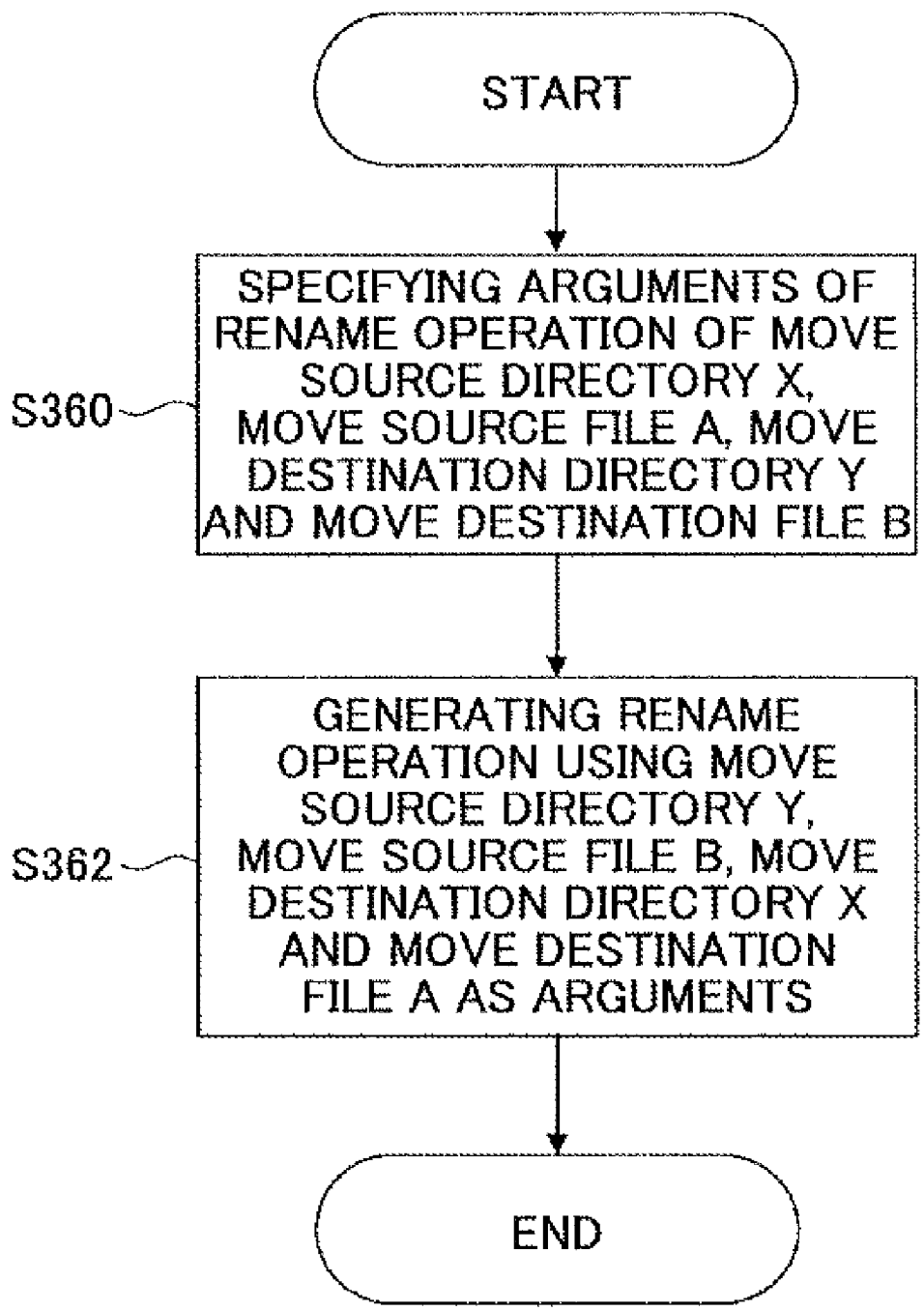
FIG. 20 is an example flowchart of the backward file operation generation process corresponding to a forward RENAME operation of the embodiment.

FIG. 20 is an example flowchart of the backward file operation generation process corresponding to the forward RENAME operation of the embodiment.

It is assumed in step S200 that the log application unit 124 specifies that the forward file operation read by the log read unit 126 is the forward RENAME operation using operands of "move source directory X", "move source file A", "move destination directory Y" and "move destination file B", and reports the forward RENAME operation to the backward log generating unit 132. In response to the report, the backward log generating unit 132 starts the backward file operation generation process corresponding to the forward RENAME operation in step S300.

In step S360, the backward log generating unit 132 specifies that the received forward RENAME operation uses the operands of "move source directory X", "move source file A", "move destination directory Y" and "move destination file B".

In step S362, the backward log generating unit 132 refers to the generation rule information of the backward file operation stored in the auxiliary storage device 68, and specifies the generation rule of the backward file operation corresponding to the forward RENAME operation. Thereafter, the backward log generating unit 132 generates the backward RENAME operation using the operands of "move source directory Y", "move source file B", "move destination directory X" and "move destination file A" in conformity with the specified generation rule of the backward file operation.

Figure 21:
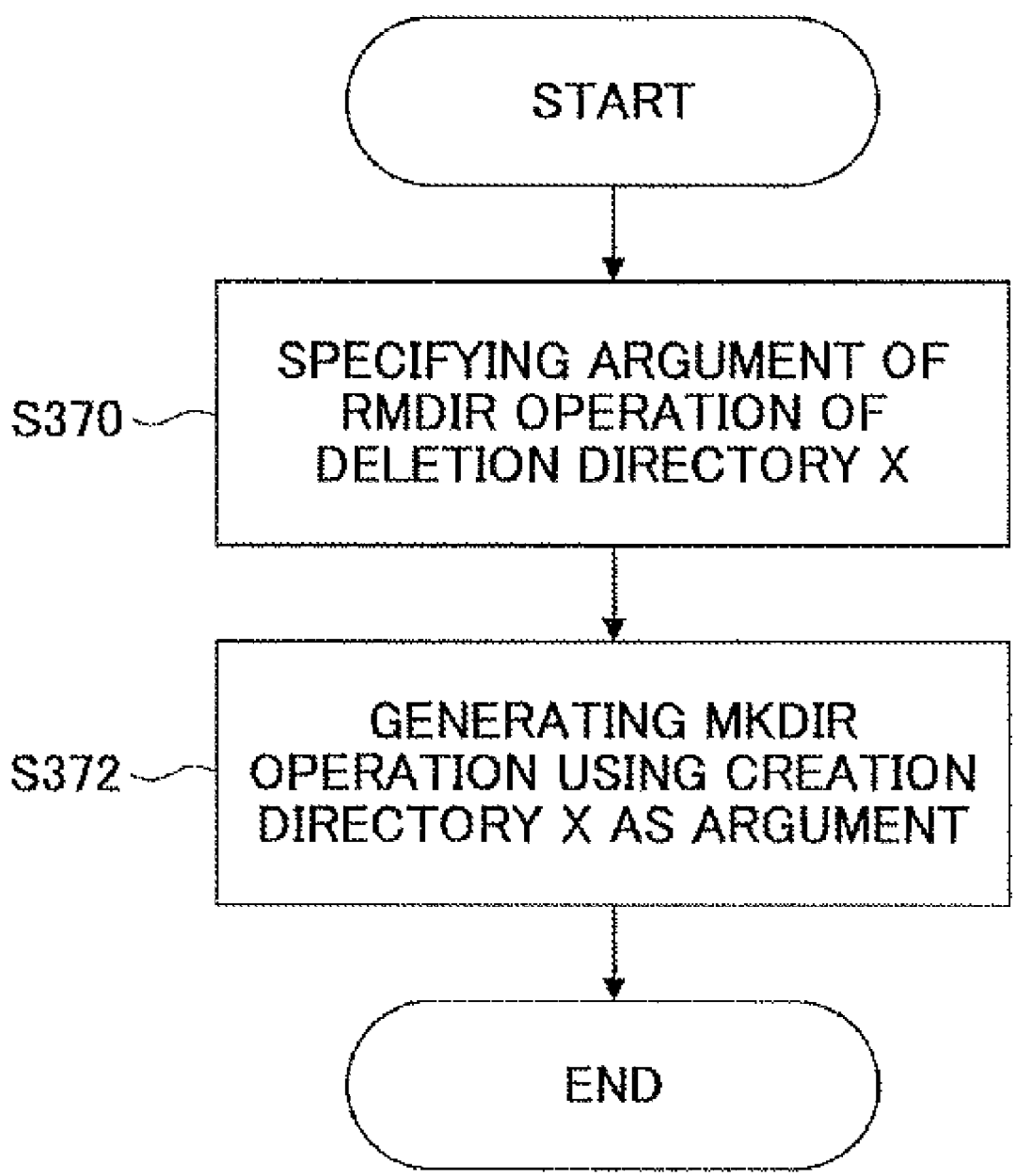
FIG. 21 is an example flowchart of the backward file operation generation process corresponding to a forward RMDIR operation of the embodiment.

FIG. 21 is an example flowchart of the backward file operation generation process corresponding to the forward RMDIR operation of the embodiment.

It is assumed in step S200 that the log application unit 124 specifies that the forward file operation read by the log read unit 126 is the forward RMDIR operation using an operand of "deletion directory X", and reports the forward RMDIR operation to the backward log generating unit 132. In response to the report, the backward log generating unit 132 starts the backward file operation generation process corresponding to the forward RMDIR operation in step S300.

In step S370, the backward log generating unit 132 specifies that the received RMDIR operation uses the operand of "deletion directory X".

In step S372, the backward log generating unit 132 refers to the generation rule information of the backward file operation stored in the auxiliary storage device 68, and specifies the generation rule of the backward file operation corresponding to the forward RMDIR operation. Thereafter, the backward log generating unit 132 generates the backward MKDIR operation using the operand of "creation directory X" in conformity with the specified generation rule of the backward file operation.

Figure 22:
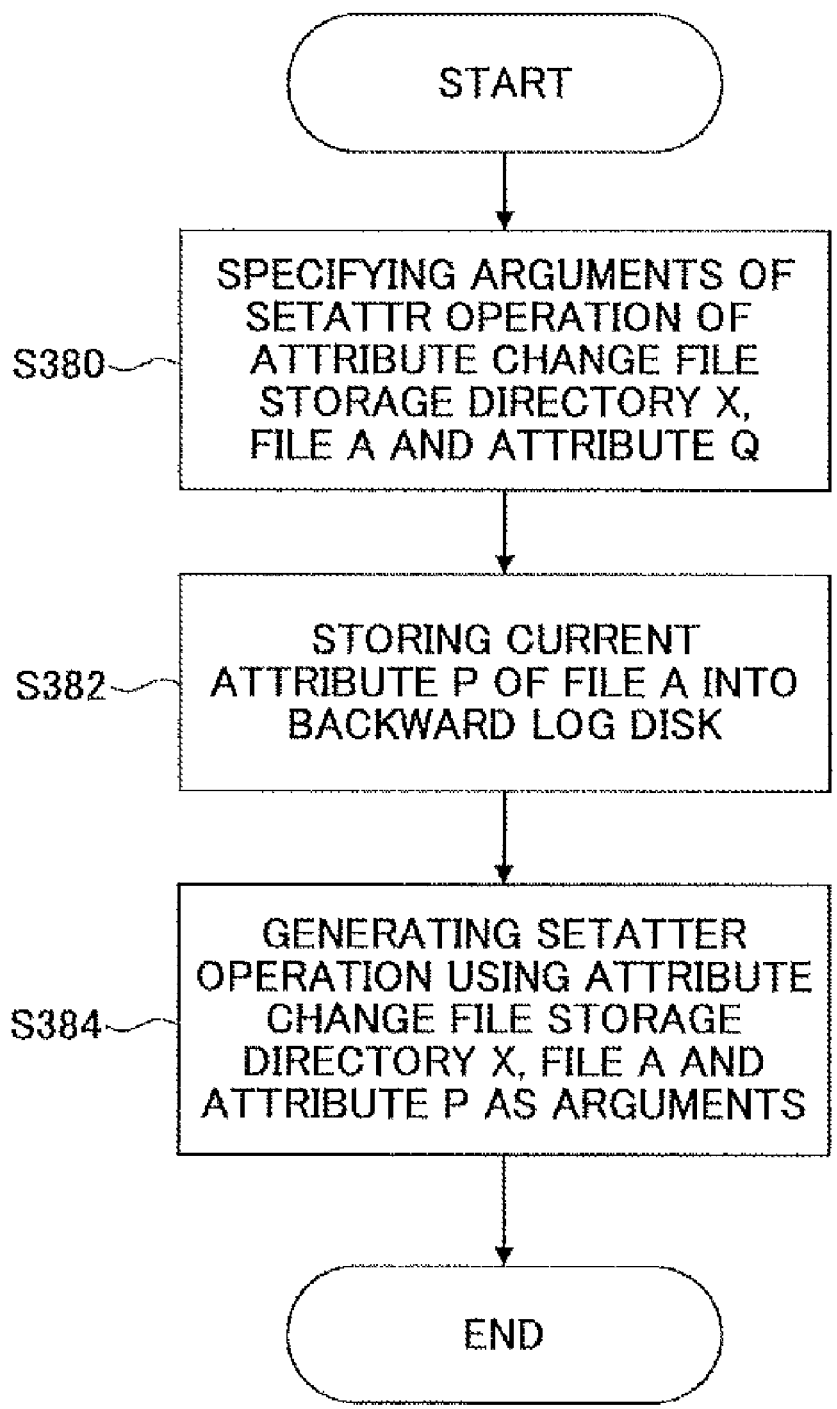
FIG. 22 is an example flowchart of the backward file operation generation process corresponding to a forward SETATTR operation of the embodiment.

FIG. 22 is an example flowchart of the backward file operation generation process corresponding to the forward SETATTR operation of the embodiment.

It is assumed in step S200 that the log application unit 124 specifies that the forward file operation read by the log read unit 126 is the forward SETATTR operation using operands of "attribute change file storage directory X", "attribute change file A" and "attribute Q", and reports the forward SETATTR operation to the backward log generating unit 132. In response to the report, the backward log generating unit 132 starts the backward file operation generation process corresponding to the forward SETATTR operation in step S300.

In step S380, the backward log generating unit 132 specifies that the received forward SETATTR operation uses the operands of "attribute change file storage directory X", "attribute change file A" and "attribute Q".

In step S382, the backward log generating unit 132 determines the original attribute P to be replaced by the attribute Q in the file A. Then, the backward log generating unit 132 stores the attribute P to be replaced by the attribute Q into the backward log disk 46 using the disk control unit 128.

In step S384, the backward log generating unit 132 refers to the generation rule information of the backward file operation stored in the auxiliary storage device 68, and specifies the generation rule of the backward file operation corresponding to the forward SETATTR operation. Thereafter, the backward log generating unit 132 generates the backward SETATTR operation using operands of "attribute change file storage directory X", "attribute change file A" and "attribute P" in conformity with the specified generation rule of the backward file operation.

Figure 23:
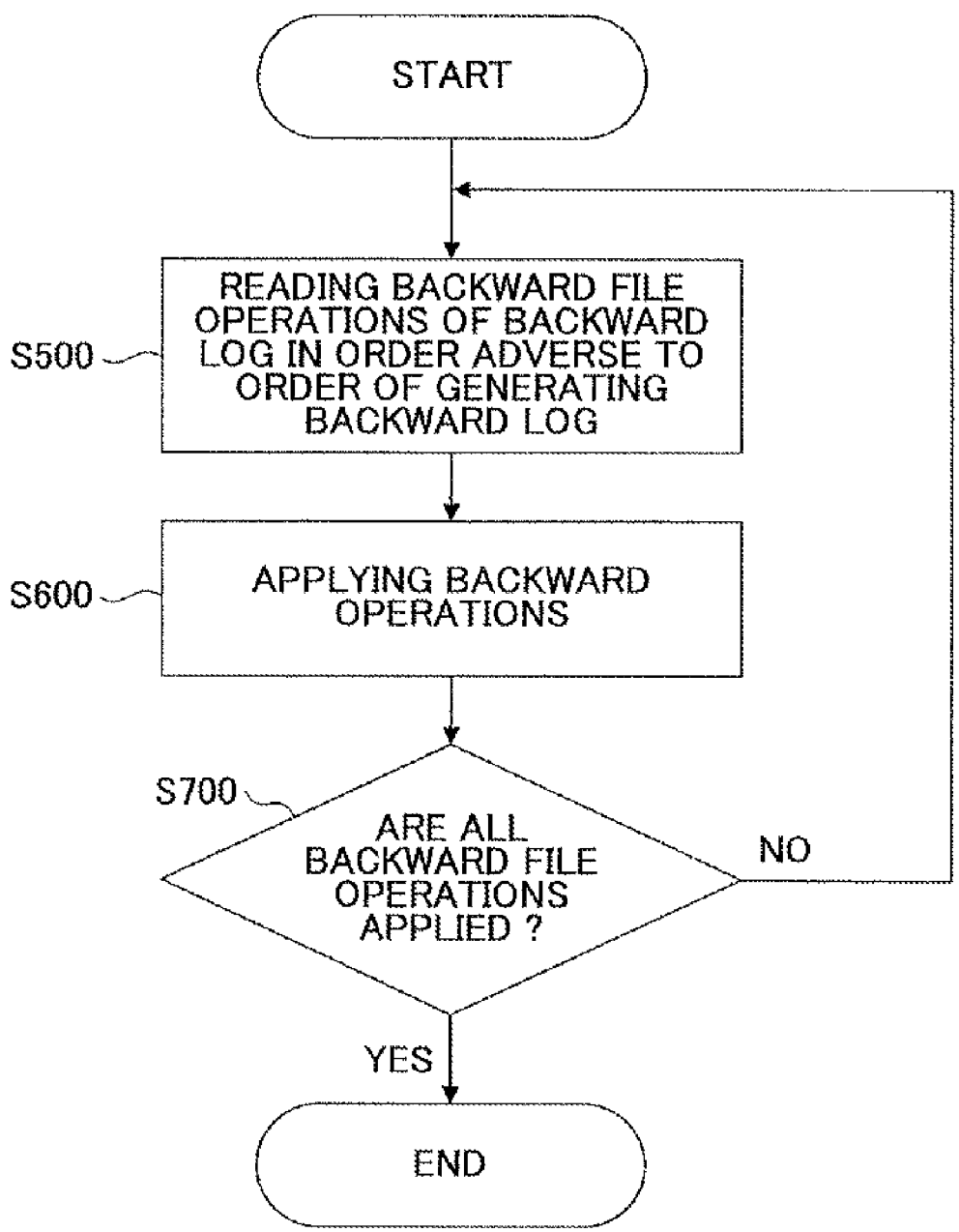
FIG. 23 is an example flowchart illustrating a recovery process using a backward log generated in the embodiment.

Referring to FIG. 23, a recovery process using the generated backward log of the embodiment is described. FIG. 23 is an example flowchart illustrating the recovery process using the backward log generated in the embodiment.

When the background process component 120 applies the backward log to current data backed up in the secondary storage 42, upon instruction, the backward log recovery process starts.

In step S500, the log application unit 124 makes the log read unit 126 acquire the backward log from the backward log disk 46. Thereafter, the log read unit 126 reads the backward file operations recorded in the backward log in the order reverse to the order of generating the backward file operations. Said differently, the log read unit 126 reads the backward file operations recorded in the backward log in the order reverse to the order of applying the forward file operations recorded in the corresponding forward log.

In step S600, the log application unit 124 applies the read backward file operations to the data backed up in the secondary storage 42.

In step S700, the log application unit 124 determines whether there is any backward file operation which is not applied yet among the read backward file operations. When all of the backward file operations have been applied up to the backward file operation corresponding to a check point to be recovered in YES of step S700, the recovery process ends. On the other hand, when there is the backward file operation which has not been applied yet in NO of step S700, the process goes to step S500 to apply the backward file operation which has not been applied yet. In this way, the above process in FIG. 23 is repeated for all the backward file operations.

According to the embodiment, it is enabled to efficiently return from current data with a forward log to data at an arbitrary past time point using a backward log.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable medium storing a computer program containing instructions executable by a processor to perform:

acquiring a forward log which includes forward file operations applied to files in an order of applying the forward file operations and is stored by a storage connected to the computer;

extracting the forward file operations from the forward log in the order of applying the forward file operations;

specifying generation rules for generating backward file operations from generation rule information, which includes the generation rules in association with the forward file operations, with reference to the extracted forward file operations;

generating the backward file operations used for recovering from the files having the extracted forward file operations applied to files not having the extracted forward file operations applied in conformity with the specified generation rules;

recording the generated backward file operations in a backward log in an order of generating the backward file operations;

applying the extracted forward file operations to the files not having the extracted forward file operations applied;

reading the generated backward file operations from the backward log in an order reverse to the order of generating the backward file operations; and applying the read backward file operations to the files having the extracted forward file operations applied to recover the files not having the extracted forward file operations applied.

2. The non-transitory computer-readable storage medium storing the program according to claim 1, further comprising:

temporarily storing the files not having the extracted forward file operations applied when the forward file operations includes a DELETE operation of at least one of the files.

3. The non-transitory computer-readable storage medium storing the program according to claim 1, wherein the forward file operations and the backward file operations include at least one of a CREATE operation, a WRITE operation, a REMOVE operation, a RECOVER operation, a LINK operation, a MKDIR operation, a RENAME operation, a RMDIR operation and a SETATTR operation.

4. An apparatus for recovering files, the apparatus comprising:

an memory that includes a forward log which includes forward file operations applied to the files in an order of applying the forward file operations and is stored in a storage;

a processor that acquires the forward log, extracts the forward file operations from the forward log in the order of applying the forward file operations, specifies generation rules for generating backward file operations from generation rule information, which includes the generation rules in association with the forward file operations, with reference to the extracted forward file operations, generates the backward file operations used for recovering from the files having the extracted forward file operations applied to files not having the extracted forward file operations applied in conformity with the specified generation rules, records the generated backward file operations in a backward log in an order of generating the backward file operations, applies the extracted forward file operations to the files not having the extracted forward file operations applied, reads the generated backward file operations from the backward log in an order reverse to the order of generating the backward file operations, and applies the read backward file operations to the files having the extracted forward file operations applied to recover the files not having with the extracted forward file operations applied.

5. A method of recovering files, the method comprising:
acquiring a forward log which includes forward file operations applied to the files in an order of applying the forward file operations and is stored in a storage;
extracting the forward file operations from the forward log in the order of applying the forward file operations;
specifying generation rules for generating backward file operations from generation rule information, which includes the generation rules in association with the forward file operations, with reference to the extracted forward file operations;
generating the backward file operations used for recovering from the files having the extracted forward file operations applied to files not having the extracted forward file operations applied in conformity with the specified generation rules;
recording the generated backward file operations in a backward log in an order of generating the backward file operations;
applying the extracted forward file operations to the files not having the extracted forward file operations applied;
reading the generated backward file operations from the backward log in an order reverse to the order of generating the backward file operations; and
applying the read backward file operations to the files having the extracted forward file operations applied to recover the files not having the extracted forward file operations applied by using a processor.

* * * * *